US010037364B1

(12) United States Patent
Kalinichenko et al.

(10) Patent No.: US 10,037,364 B1
(45) Date of Patent: Jul. 31, 2018

(54) USER INTERFACE PORTLET DATA CASCADE ACTUATOR APPARATUSES, METHODS AND SYSTEMS

(71) Applicant: FMR LLC, Boston, MA (US)

(72) Inventors: Boris Olegovich Kalinichenko, Jamaica Plain, MA (US); James Chee-Ming Wong, Topsfield, MA (US); Michael Cassidy, Hamilton, MA (US)

(73) Assignee: FMR LLC, Boston, MA (US)

( * ) Notice: Subject to any disclaimer, the term of this patent is extended or adjusted under 35 U.S.C. 154(b) by 379 days.

(21) Appl. No.: 14/958,731

(22) Filed: Dec. 3, 2015

Related U.S. Application Data

(60) Provisional application No. 62/087,750, filed on Dec. 4, 2014.

(51) Int. Cl.
*G06F 17/30* (2006.01)
*G06F 3/0484* (2013.01)
*G06F 3/0482* (2013.01)

(52) U.S. Cl.
CPC ...... *G06F 17/30554* (2013.01); *G06F 3/0482* (2013.01); *G06F 3/04842* (2013.01)

(58) Field of Classification Search
CPC ............ G06F 17/30554; G06F 3/0482; G06F 3/04842
USPC ........................................................ 715/738
See application file for complete search history.

(56) References Cited

U.S. PATENT DOCUMENTS

| 6,304,893 | B1 * | 10/2001 | Gish | G06F 8/24 |
| | | | | 707/999.01 |
| 6,886,134 | B1 * | 4/2005 | Cason | G06F 17/30893 |
| | | | | 707/E17.117 |
| 7,770,185 | B2 * | 8/2010 | Naidu | G06F 9/54 |
| | | | | 712/29 |
| 8,001,477 | B2 * | 8/2011 | Nauerz | G06F 9/543 |
| | | | | 715/742 |
| 8,868,593 | B1 * | 10/2014 | Zhang | G06F 17/30554 |
| | | | | 707/769 |
| 2004/0181543 | A1 * | 9/2004 | Wu | G06F 17/30572 |
| 2007/0124688 | A1 * | 5/2007 | Nauerz | G06F 9/543 |
| | | | | 715/746 |

(Continued)

*Primary Examiner* — Tadeese Hailu
(74) *Attorney, Agent, or Firm* — Hanchuk Kheit LLP; Walter G. Hanchuk

(57) ABSTRACT

The User Interface Portlet Data Cascade Actuator Apparatuses, Methods and Systems ("UIPDCA") transforms database data sets, user interface widget data selections inputs via UIPDCA components into cascading UI subsequent views data selections and channel outputs. In one embodiment, the UIPDCA may include a data cascade user interface view apparatus. The UIPDCA's processor issues instructions from a UI view component to generate and broadcast a first event message that specifies a data source parameter associated with a user selection and the channel associated with the UI view component. The UIPDCA's processor issues instructions from a subsequent UI view component to update UI widget elements based on result of executing a query modified using parameters specified in the first event message, and to generate and broadcast a second event message that specifies a data source parameter associated with a default selection and the channel associated with the subsequent UI view component.

18 Claims, 26 Drawing Sheets

EXEMPLARY UIPDCA EVENT FLOW

(56) References Cited

U.S. PATENT DOCUMENTS

| | | | | |
|---|---|---|---|---|
| 2008/0052372 A1* | 2/2008 | Weber | ............... | G06F 17/30265 |
| | | | | 709/217 |
| 2009/0327255 A1* | 12/2009 | Larson | .............. | G06F 17/30457 |
| 2012/0158795 A1* | 6/2012 | Ireland | .............. | G06F 17/30383 |
| | | | | 707/803 |
| 2014/0095444 A1* | 4/2014 | Deshmukh | ........ | G06F 17/30463 |
| | | | | 707/661 |
| 2014/0095471 A1* | 4/2014 | Deshmukh | ........ | G06F 17/30463 |
| | | | | 707/714 |

* cited by examiner

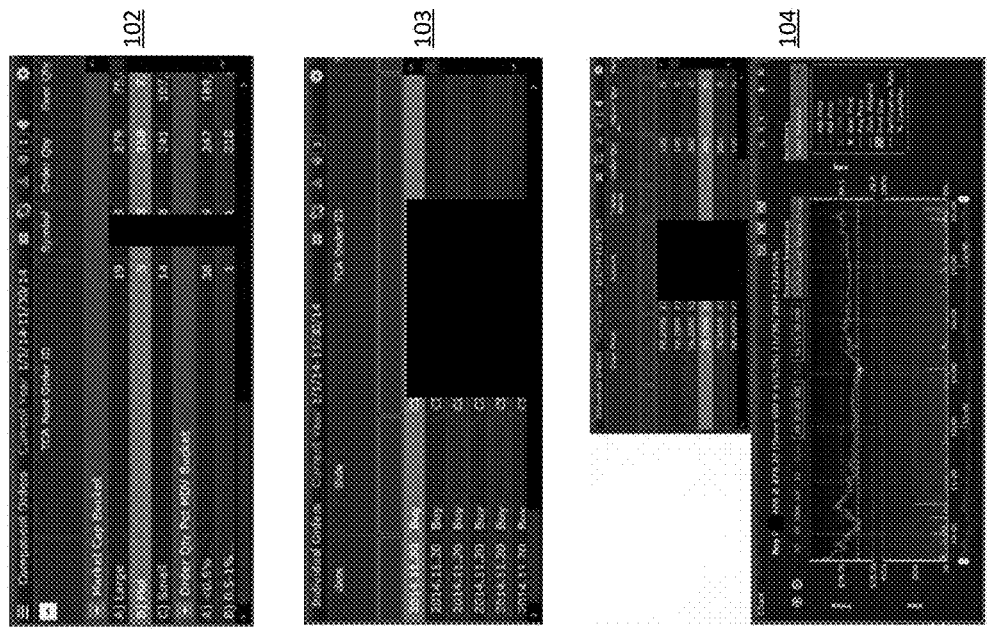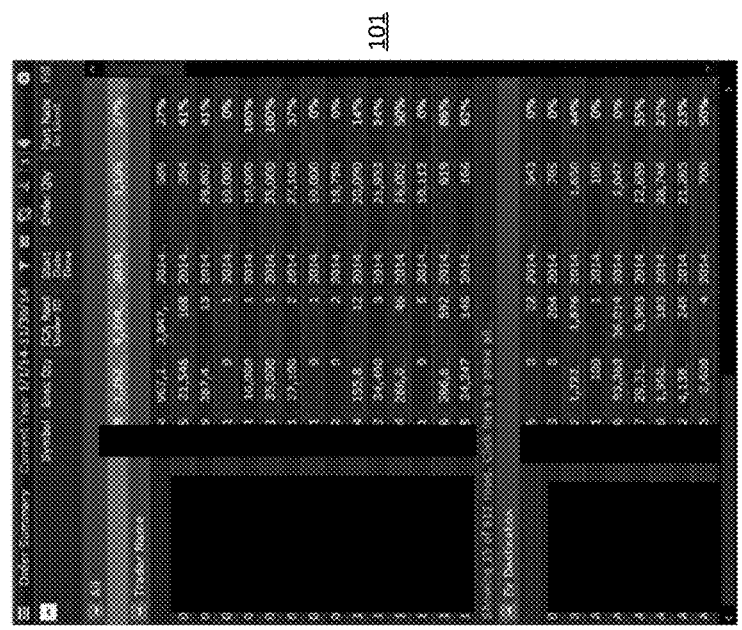
FIGURE 1

EXEMPLARY UIPDCA EVENT FLOW

EXEMPLARY UIPDCA NEW UI VIEW COMPONENT OPENING (NUIVCO) COMPONENT

EXEMPLARY UIPDCA UI VIEW COMPONENT MESSAGE EMITTING (UIVCME) COMPONENT

EXEMPLARY UIPDCA UI VIEW COMPONENT MESSAGE PROCESSING (UIVCMP) COMPONENT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

EXEMPLARY UIPDCA SCREENSHOT

USER INTERFACE PORTLET DATA CASCADE ACTUATOR APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 62/087,750, filed Dec. 4, 2014, entitled "User Interface Portlet Data Cascade Actuator Apparatuses, Methods and Systems,".

The entire contents of the aforementioned applications are herein expressly incorporated by reference.

FIELD

The present innovations generally address user interface views and databases, and more particularly, include User Interface Portlet Data Cascade Actuator Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

User interfaces allow users to control computers to navigate through various operating and application feature sets. Modern operating systems provide windows, point cursors and/or touch screens to allow users to manipulate on screen user interface widgets. Examples of modern day operating systems that include examples of such interfaces include Apple's OS X and iOS, and Microsoft's Windows 10 and Mobile.

BRIEF DESCRIPTION OF THE DRAWINGS

Appendices and/or drawings illustrating various, non-limiting, example, innovative aspects of the User Interface Portlet Data Cascade Actuator Apparatuses, Methods and Systems (hereinafter "UIPDCA") disclosure, include:

FIG. 1 shows a block diagram illustrating embodiments of a UI subview data cascade for the UIPDCA;

Figure 2:
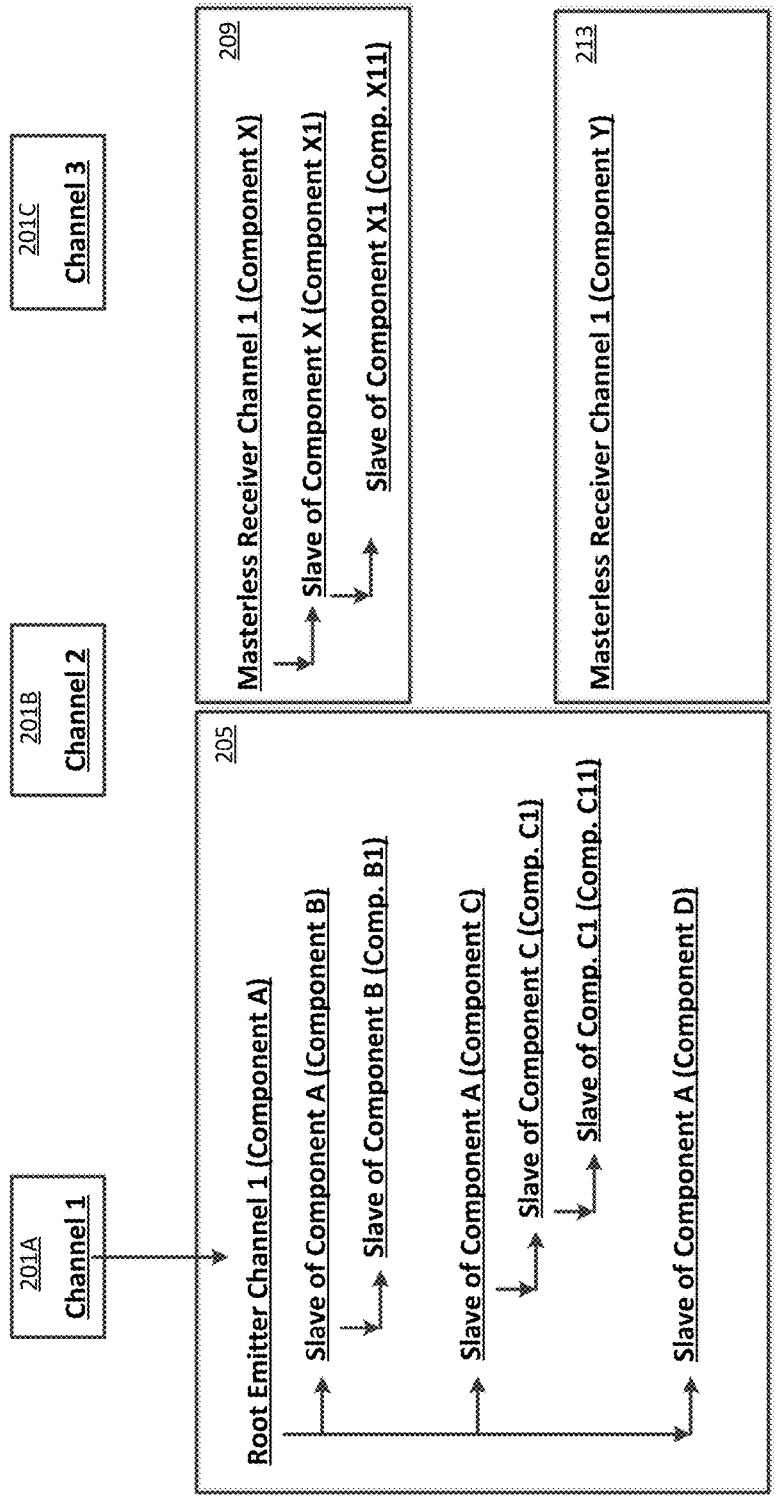
FIG. 2 shows an exemplary taxonomy for the UIPDCA.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The User Interface Portlet Data Cascade Actuator Apparatuses, Methods and Systems (hereinafter "UIPDCA") transforms database data sets, user interface widget data selections inputs, via UIPDCA components (e.g., NUIVCO, UIVCME, UIVCMP, etc. components), into cascading UI subsequent views data selections and channel outputs. The UIPDCA components, in various embodiments, implement advantageous features as set forth below.

INTRODUCTION

The UIPDCA provides a new kind of UI (user interface) view and subview (e.g., portlet) where each view incorporates and/or associates with narrowing query filter elements.

As such, the UIPDCA may be given an extremely large data corpus, e.g., a large database. An initial UI view may be connected to the data corpus and select (e.g., aggregated or other) specific data for initial display.

UIPDCA

FIG. 1 shows a block diagram illustrating embodiments of a UI subview data cascade for the UIPDCA. The UIPDCA improves trading performance and provides transparency into trading. There is a wide breadth in sophistication of users. Some users are very quantitative so will want to intact with the UIPDCA directly. Other users are not quantitative or do not have the time, so will want the UIPDCA to do the interpretation of the results for them (e.g., trading consulting).

When users (e.g., traders) look at the trade flow, it is useful for them to see what affected the trade flow so that they could compare different execution venues.

From the technology stand point what users are looking for may constitute an interface view (e.g., a collection of data points that the trader is interested in) and a filter (e.g., a "where clause" that narrows down the data set).

One example use case is a "let's look at the big picture and drill down into what appears to be problematic to me" scenario. So, the user might start with a "summary grid", that may be defined as a (view, filter) tuple and looks as shown at 101 to the end user (e.g., this grid may be called "first grid").

Now the trader might see how component orders (e.g., orders that went through algorithmic trading) contribute to the big picture, so the trader opens a new grid which is now linked to the first grid by relationship "whatever is selected in the first grid, find appropriate component orders". "Whatever is selected" is defined by the where clause, dynamically constructed based on selected rows in the first grid.

This may call a next (e.g., cascade) view to open 102, where the second grid may take on a view based on the subview selection having an associated subview with associated query constraints to provide further specificity about the selected subview item.

Now the first and second grids are related to each other. Both of them are on Channel 1, grid one is an emitter of a dynamic data filter and grid two is a receiver of a dynamic data filter. This relatedness creates a cascade connection so that if any selection changing a data set for any one of the earlier views is made, the subview associated query now operates to update itself and present new subview information.

On top of receiving a filter from the master component, the slave component also knows data transformation type, which can be one of "default", "parents", "children", etc. Data transformation generally is not expressed as a where clause, but it does represent a very specific data retrieval method.

Data filter+data transformation type yields a new data set, which can be visualized as a grid, chart or any other visually distinct component in the user's browser.

After instantiating grid one and grid two, the user might want to drill even further into yet another cascade view (e.g., as in Mid cap orders as in 102). So grid three will be also presented to the user in the browser 103.

So now the user will experience a system with 3 cascading data views (e.g., grids, where selection in grid 1 drives data set presented in grid 2 and selection in grid 2 drives a dataset presented in grid 3). At some point the user might decide to view a chart or some other visually meaningful information related to a particular row in one of the grids. As such, the user has established a single channel dependency chain.

The user might be supporting multiple clients, so the user may wish to see several chains simultaneously. To separate one chain from another, each chain may have a unique channel.

Another feature of the UIPDCA is automatic component matching. Some of the visual components are leafs, meaning that they only intake a filter, but don't emit anything. Data that leafs intake define a single order. If the UIPDCA provides a record grid, where a single row selection, by definition, yields a single order, then the UIPDCA may match up a grid and, for example, a chart 104.

FIG. 2 shows an exemplary taxonomy for the UIPDCA. In FIG. 2, a taxonomy that utilizes three channels (e.g., Channel 1 201A, Channel 2 201B, and Channel 3 201C) is shown. UI view components associated with different channels are independent of each other. Thus, messages emitted by UI view components on one channel may be ignored by UI view components operating on different channels.

As shown in FIG. 2, channel 1 in the exemplary taxonomy is utilized by a plurality of UI View components. The set of UI view components 205 includes Component A, which is a root emitter for Channel 1. Component A may be the first UI view component (e.g., first grid) shown to a user. Component A, a master component, may have a set of slave components (e.g., a set including Component B, Component C and Component D) that receive and handle messages emitted by their master component (e.g., messages that indicate that the user changed selection in the emitting UI View component).

Each of the slave components may in turn have its own set of slave components for which it acts as the master component. For example, Component B may have a set of slave components that includes Component B1. In another example, Component D may not have any slave components.

The set of UI view components 209 includes Component X, which is a masterless receiver on Channel 1. A masterless receiver does not have an explicit master component. Instead, a masterless receiver receives and handles any messages on its channel that it is able to handle. Thus, Component X may receive and handle messages emitted by any components in the set of UI view components 205 or by another masterless receiver 213 (e.g., if Component Y is configured to emit messages) that Component X is configured to handle (e.g., Component X may be configured to handle any message that specifies a target stock ticker by displaying an order chart for the target stock ticker). Component X may also be a master component and may have a set of slave components (e.g., a set including Component X1) that receive and handle messages emitted by their master component.

In some embodiments, each UI view component (e.g., a portlet) may be defined by a UI view component data structure (e.g., organized as one or a plurality of data structures) that includes a set of fields that may specify the following information: a visualization associated with the UI view component (e.g., a grid that shows specified fields, a specific type of chart); a channel associated with the UI view component; a query associated with the UI view component (e.g., a SQL query template that specifies how to retrieve data used for the visualization); a data source parameter associated with the UI view component (e.g., a set that may include specification of a database, a database table, a database row (record), a dataset, and/or the like that may be plugged into the SQL query template to generate a SQL query that uses the specified data source); a query modifier parameter associated with the UI view component (e.g., a set that may include specification of a master's filter (e.g., to modify a WHERE clause of the SQL query based on the master's state), a transformation function (e.g., additional processing to be applied, such as to find child orders using additional SQL queries), a local filter (e.g., to filter by specified dates and/or times, trader names), and/or the like that may be used to modify the SQL query).

In some embodiments, each UI view component (e.g., a portlet) may act as an emitter of event messages (e.g., broadcast an event message when selected row changes), a receiver of event messages (e.g., listen for broadcasts of event messages from master), or both an emitter and a receiver. For example, Component A may be an emitter, but not a receiver. In another example, Component B may be both an emitter and a receiver. In yet another example, Component Y may be a receiver, but not an emitter.

Figure 3:
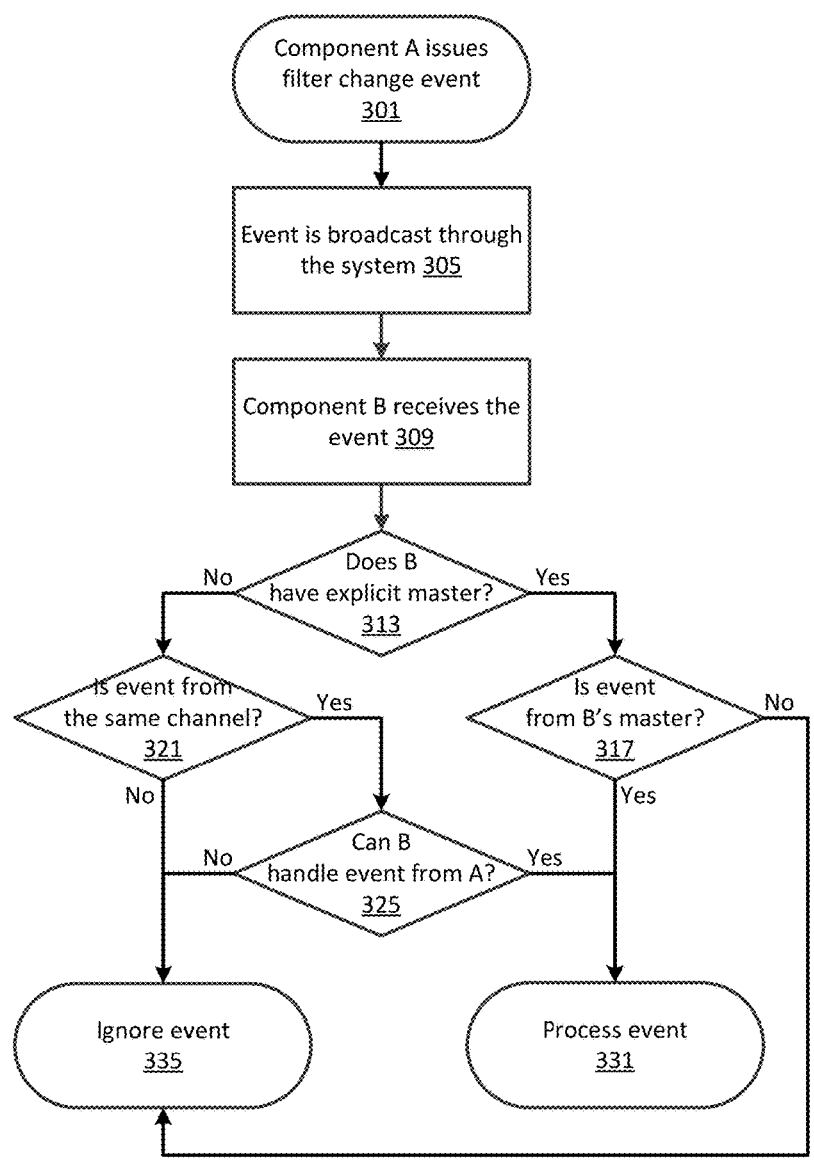
FIG. 3 shows an exemplary event flow for the UIPDCA.

FIG. 3 shows an exemplary event flow for the UIPDCA. In FIG. 3, a UI view component Component A issues a filter change event at 301. For example, Component A may emit a message to indicate that a user selected a different row in a grid that shows trades. The event may be broadcast through the system at 305.

Another UI view component Component B receives the event at 309. For example, Component B may visualize a chart for a selected trade. A determination may be made at 313 whether Component B has an explicit master component. If Component B has a master, a determination may be made at 317 whether the event came from Component B's master (e.g., is Component A the master of Component B). If so, Component B may process the event at 331 (e.g., update the chart to show data for the newly selected trade); otherwise, Component B may ignore the event at 335 (e.g., continue displaying the current chart).

If Component B does not have a master (e.g., Component B is a masterless component), a determination may be made at 321 whether the event came from the channel associated with Component B. If so, a determination may be made at 325 whether Component B can handle the event from Component A (e.g., does the event specify a trade for which Component B can generate a chart). If Component B can handle the event, Component B may process the event at 331. If Component B cannot handle the event or if the event came from a different channel, Component B may ignore the event at 335.

Figure 4:
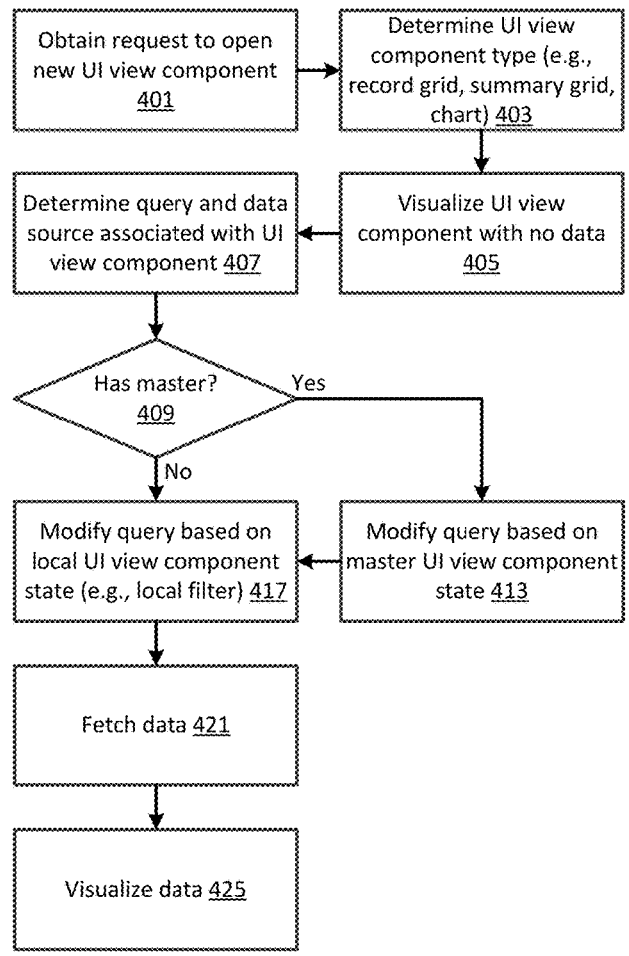
FIG. 4 shows a logic flow diagram illustrating embodiments of a new UI view component opening (NUIVCO) component for the UIPDCA.

FIG. 4 shows a logic flow diagram illustrating embodiments of a new UI view component opening (NUIVCO) component for the UIPDCA. In FIG. 4, a request to open a new UI view component may be obtained at 401. For example, this request may be obtained when a user wishes to open a new UI view component (e.g., by right clicking on a row in a grid and selecting a "Chart" option to indicate that a new UI view component showing a chart should be opened; by selecting a layout, which specifies a set of UI view components to open, for display). In one implementation, an exemplary function provided below may be called to open a new UI view component:

```
_handleSlaveDisplay: function(action, viewTitle, traceType, viewId,
visualizationId, filters){
    var childOpt = $.extend(true, { }, this.localOpt);
    var actionInfo = FI.parsePortletId(action),
        viewToLoad = FI.mainViewPath(actionInfo.appName,
actionInfo.compName);
    childOpt.args = actionInfo.compArg;
    switch(action) {
        case 'visualization_WAR_ftcaportlet': {
            // we are invoking 3rd party visualization on a set of orders. In
order for visualization to work we should to know visualization ID
            childOpt.preferences.visualizationID = visualizationId;
        } break;
        case 'ordergrid_summary_WAR_ftcaportlet' : {
            if(viewId === undefined){
                // current view should support summarization
                var currentView = this.loader.getView( );
                if(currentView.crossSections.length === 0){
                    viewId = DFLT_ORDER_VIEW_ID;
                } else {
                    var hasAggregations = false;
                    $.each(currentView.selectionFields,
function(index, field){
                        if(field.aggregations.length > 0){
                            hasAggregations = true;
                        }
                    });
                    if(!hasAggregations){
                        viewId = DFLT_ORDER_VIEW_ID;
                    }
                }
            }
        } break;
        case 'ordergrid_summary_exec_WAR_ftcaportlet' : {
            if(viewId === undefined){
                // current view should support summarization
                var currentView = this.loader.getView( );
                if(currentView.crossSections.length === 0){
                    viewId = DFLT_EXEC_VIEW_ID;
                } else {
                    var hasAggregations = false;
                    $.each(currentView.selectionFields,
function(index, field){
                        if(field.aggregations.length > 0){
                            hasAggregations = true;
                        }
                    });
                    if(!hasAggregations){
                        viewId = DFLT_EXEC_VIEW_ID;
                    }
                }
            }
        } break;
    }
    var realTimeContext = this.isRealTimeContext( );
    childOpt.el = null;
    this.setChildDialogOptions(childOpt, {viewTitle: viewTitle, action:
action});
    childOpt.inheritedFilters = filters; // this is a filter imposed on us by
the caller portlet row selection
    childOpt.masterDatasetId = this.loader.getDatasetId( );
    childOpt.preferences.master = this.loader.getMaster( );
    childOpt.preferences.filterId = this.loader.getFilterId( );
    childOpt.parentLoader = this.loader;
    childOpt.preferences.filter = null; // child has no filter initially
    childOpt.preferences.QFpinState = false;
    childOpt.preferences.traceType = traceType || 'DEFAULT';
    if(!!viewId) {
        when(App.viewStore.get(viewId), function(promisedView){
            childOpt.preferences.view = $.extend(true, { }, promisedView);
            Utils.renderDialog(viewToLoad, childOpt);
        });
    } else {
        // current view is tied to the loader, but if we trim the view for
loader to speed up the app,
        // we still should pass "full" view into slaves
        childOpt.preferences.view = $.extend(true, { },
this.currentCompleteView( ));
        childOpt.preferences.viewId = null;
        Utils.renderDialog(viewToLoad, childOpt);
    }
},
```

The UI view component type of the new UI view component may be determined at 403. The UI view component type may specify the visualization associated with the new UI view component. In various implementations, UI view component types may include grid types (e.g., order record grid, summary grid, execution record grid, execution summary grid), chart types (e.g., single order chart, order summary chart, execution summary chart), diagnostics, text, and/or the like. For example, the UI view component type may be determined based on a parameter (e.g., an identifier of a visualization to use) provided in the request.

The new UI view component may be visualized with no data at 405. For example, based on the UI view component type of the new UI view component, a blank grid, a blank chart, a blank text page, and/or the like may be visualized.

A query associated with the new UI view component may be determined at 407. The query may specify how to retrieve data for the visualization associated with the new UI view component. In one implementation, the query may be determined (e.g., a SQL query template may be retrieved from a database) based on the identifier of the visualization. The query may be modified based on a data source parameter provided in the request. For example, the query may take on the following form:
   SELECT *
   FROM Orders
   WHERE orderID="order identifier specified in the data source parameter";
In one implementation, the query above may be generated by plugging the name of the specific order identifier and/or the table (e.g., Orders) specified in the data source parameter into the retrieved SQL query template.

A determination may be made at 409 whether the new UI view component has a master UI view component. In one implementation, this determination may be made based on a parent parameter provided in the request. For example, if the parent parameter specifies an identifier of the parent, then the parent is the master. In another example, if the parent parameter is null, then there is no master.

If there is a master, the query may be modified based on the master UI view component state at 413. In one implementation, a filter associated with the master may be determined based on a query modifier parameter provided in the request, and the query may be modified based on the master's filter. For example, the query may take on the following
   form:
   SELECT *
   FROM Orders
   WHERE orderID="order identifier specified in the data source parameter" AND orderDate="2015-01-01";
The query may be modified based on the local UI view component state of the new UI view component at 417. In one implementation, a local filter associated with the new UI view component may be determined based on user selection (e.g., the user may wish to show orders from a particular trader), and the query may be modified based on the local filter. For example, the query may take on the following form:
   SELECT *
   FROM Orders
   WHERE orderID="order identifier specified in the data source parameter" AND orderDate="2015-01-01" AND
     traderName="name of the specified trader";
Data used to generate the visualization associated with the new UI view component may be fetched at 421. In one implementation, the query may be sent (e.g., via a PHP page) to a database server that returns the requested data. In another implementation, parameters for a query may be determined and sent from a web page associated with the new UI view component (e.g., using JSON) to an application server, which may generate a SQL query, send the SQL query to a database server to obtain the requested data, and return the requested data (e.g., using JSON) to the web page.

The new UI view component may be visualized using the fetched data at 425. For example, a grid, a chart, a text page, and/or the like may be visualized to show the obtained data in proper format for the visualization.

Figure 5A:
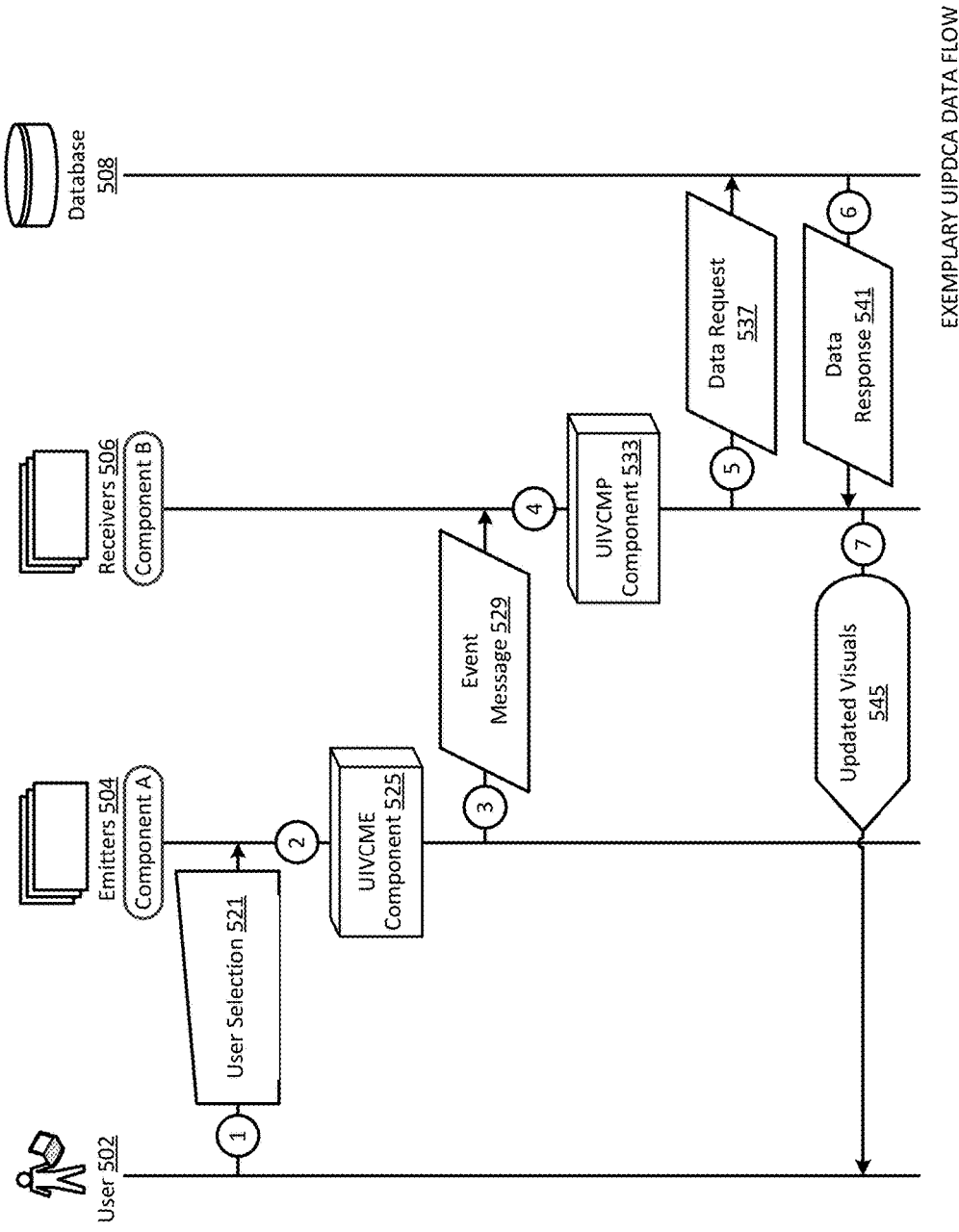
FIGS. 5A-5B show a datagraph diagram illustrating embodiments of a data flow for the UIPDCA.
Figure 5B:
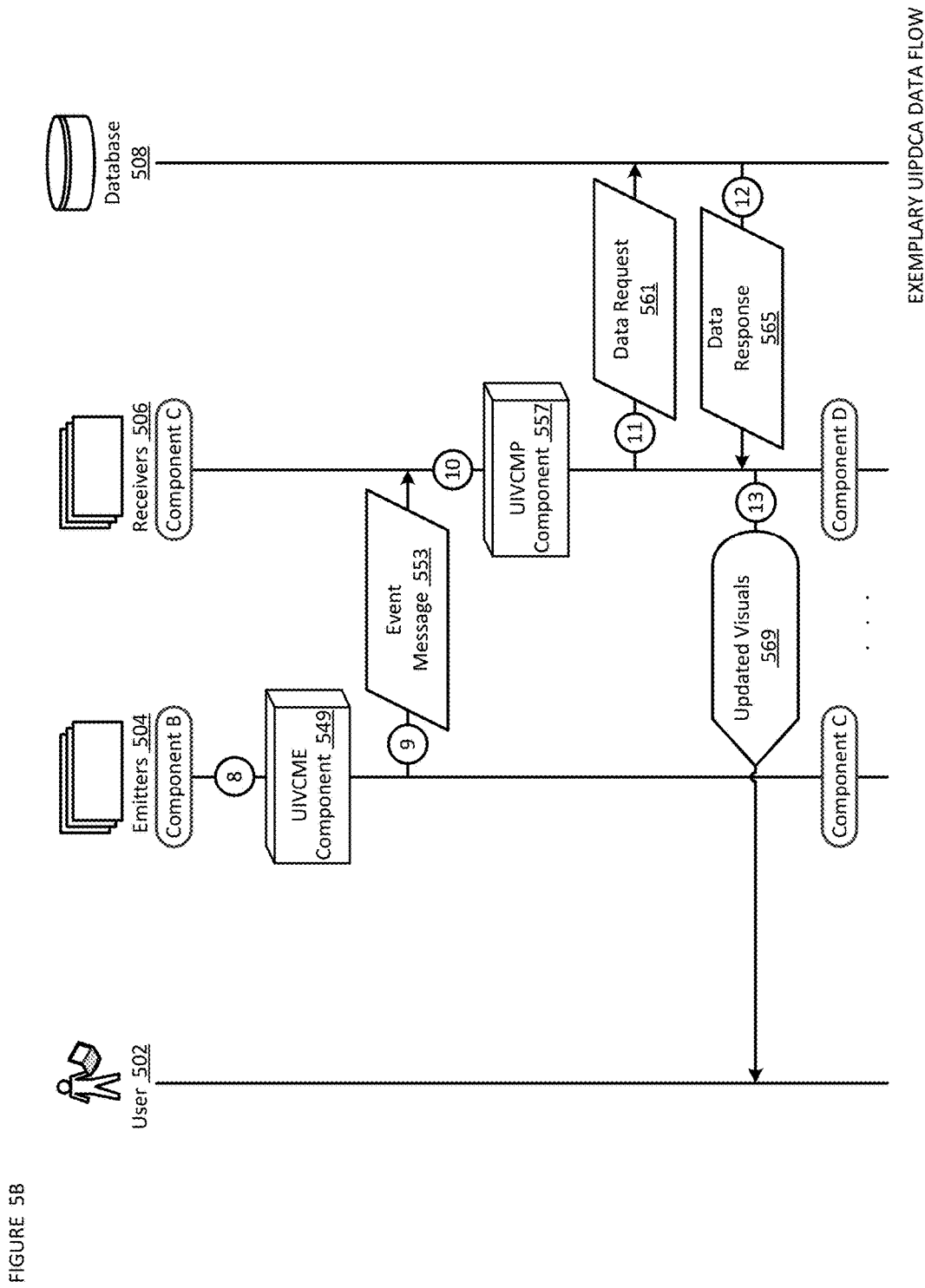

FIGS. 5A-5B show a datagraph diagram illustrating embodiments of a data flow for the UIPDCA. In FIGS. 5A-5B, a user 502 (e.g., an analyst utilizing the UIPDCA) may make a user selection 521. In one embodiment, the user may use a client device (e.g., a desktop, a laptop, a tablet, a smartphone) to access a UIPDCA website, application (e.g., a mobile app), and/or the like to log into the UIPDCA using an authentication request. For example, the client may provide the following example authentication request, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
  <timestamp>2020-12-31 23:59:59</timestamp>
  <user_accounts_details>
    <user_account_credentials>
      <user_name>JohnDaDoeDoeDoooee@gmail.
        com</account_name>
      <password>abc123</password>
      //OPTIONAL <cookie>cookieID</cookie>
      //OPTIONAL
        <digital_cert_link>www.mydigitalcertificate.
        com/JohnDoeDaDoeDoe@gmail.com/mycerti-
        fcate.dc</digital_cert_link>
      //OPTIONAL     <digital_certificate>_DATA_
        </digital_certificate>
    </user_account_credentials>
  </user_accounts_details>
  <client_details>//iOS Client with App and Webkit
    //it should be noted that although several client
      details
    //sections are provided to show example variants of
      client
    //sources, further messages will include only on to
      save
    //space
  <client_IP>10.0.0.123</client_IP>
  <user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201
    Safari/9537.53</user_agent_string>
  <client_product_type>iPhone6,1</client_product_
    type>
  <client_serial_number>DNXXX1X1XXXX</client_
    serial_number>
  <client_UDID>3XXXXXXXXXXXXXXXXXXX-
    XXXXD</client_UDID>
  <client_OS>iOS</client_OS>
  <client_OS_version>7.1.1</client_OS_version>
  <client_app_type>app with webkit</client_app_type>
  <app_installed_flag>true</app_installed_flag>
  <app_name>UIPDCA.app</app_name>
```

```
<app_version>1.0</app_version>
<app_webkit_name>Mobile Safari</client_webkit_
   name>
<client_version>537.51.2</client_version>
</client_details>
<client_details>//iOS Client with Webbrowser
   <client_IP>10.0.0.123</client_IP>
   <user_agent_string>Mozilla/5.0 (iPhone; CPU iPhone
      OS 7_1_1 like Mac OS X) AppleWebKit/537.51.2
      (KHTML, like Gecko) Version/7.0 Mobile/11D201
      Safari/9537.53</user_agent_string>
   <client_product_type>iPhone6,1</client_product_
      type>
   <client_serial_number>DNXXX1X1XXXX</client_
      serial_number>
   <client_UDID>3XXXXXXXXXXXXXXXXXXX-
      XXXXXD</client_UDID>
   <client_OS>iOS</client_OS>
   <client_OS_version>7.1.1</client_OS_version>
   <client_app_type>web browser</client_app_type>
   <client_name>Mobile Safari</client_name>
   <client_version>9537.53</client_version>
</client_details>
<client_details>//Android Client with Webbrowser
   <client_IP>10.0.0.123</client_IP>
   <user_agent_string>Mozilla/5.0 (Linux; U; Android
      4.0.4; en-us; Nexus S Build/IMM76D) AppleWeb-
      Kit/534.30 (KHTML, like Gecko) Version/4.0
      Mobile Safari/534.30</user_agent_string>
   <client_product_type>Nexus S</client_product_type>
   <client_serial_number>YXXXXXXXXZ</client_se-
      rial_number>
   <client_UDID>FXXXXXXXXX-XXXX-XXXX-
      XXXX-XXXXXXXXXXXX</client_UDID>
   <client_OS>Android</client_OS>
   <client_OS_version>4.0.4</client_OS_version>
   <client_app_type>web browser</client_app_type>
   <client_name>Mobile Safari</client_name>
   <client_version>534.30</client_version>
</client_details>
<client_details>//Mac Desktop with Webbrowser
   <client_IP>10.0.0.123</client_IP>
   <user_agent_string>Mozilla/5.0 (Macintosh; Intel Mac
      OS X 10_9_3) AppleWebKit/537.75.14 (KHTML,
      like Gecko) Version/7.0.3 Safari/537.75.14</user_
      agent_string>
   <client_product_type>MacPro5,1</client_product_
      type>
   <client_serial_number>YXXXXXXXXZ</client_se-
      rial_number>
   <client_UDID>FXXXXXXXXX-XXXX-XXXX-
      XXXX-XXXXXXXXXXXX</client_UDID>
   <client_OS>Mac OS X</client_OS>
   <client_OS_version>10.9.3</client_OS_version>
   <client_app_type>web browser</client_app_type>
   <client_name>Mobile Safari</client_name>
   <client_version>537.75.14</client_version>
</client_details>
</auth_request>
```

The logged in user may select a row in a grid of a UI view component Component A, and Component A may be informed regarding the selection by listening to row selection events.

Component A may be acting as one of the emitters 504, which broadcast event messages (e.g., when selection in an emitter changes) on a channel (e.g., channel 1). Accordingly, Component A may utilize a UI view component message emitting (UIVCME) component 525 to generate and emit an event message 529. See FIG. 6 for additional details regarding the UIVCME component. For example, an event message may include JSON-formatted data as provided below:

```
{
   REALTIME_CONTEXT: false,
   channel: "1",
   datasetId: "500398713468533000",
   filter:
      {
         filterFields: [ ];
         id: "localfilteritem"
         type: "SESSION"
      },
   idList:
      {0:
         {
            ORDER_MARKETCAPBUCKET: "C) Small";
            ORDER_PRICEBUCKET: "C) 5-10";
            ORDER_SIDE: "Buy";
         }
      },
   loader: function( ){ },
   portletEmitsTo: {
      0: "MULTI_ORDER"
   },
   portletId: "ordergrid_summary_WAR_ftcaportlet_DLG_a7509f59-
b045-4b57-937a-565e55ba5d27";
   presentation: "SUMMARY_GRID";
   table: "Order"
}
```

Another UI view component Component B may be acting as one of the receivers 506, which may receive and/or handle event messages (e.g., when a receiver receives a message from its master, when a masterless receiver receives a message it can handle on its channel). Accordingly, Component B may utilize a UI view component message processing (UIVCMP) component 533 to update Component B's visualization. See FIG. 7 for additional details regarding the UIVCMP component.

Component B may send (e.g., via a browser) a data request 537 to a database 508 to retrieve data utilized to update Component B's visualization. In one implementation, the data request may include data such as datasetId (e.g., identifier of the starting dataset), filter (e.g., how to filter the dataset during first pass at data—based, for example, on the master's filter), traceType (e.g., how to transform data received after the first pass—second pass), targetFilter (e.g., how to filter data after it was transformed at the second pass—based, for example, on the local filter), and/or the like. For example, the data request may include JSON-formatted data as provided below:

```
{transactionId: "6",...}
  datasetId: "500398713468533000"
    filer: {filterFields: [{metadataDataType: "DATE, metadataId:
"ORDER_DATE",...}] }
    filterFields: [{metadataDataType: "DATE", metadataId: "ORDER_DATE",...}]
      0: {metadataDataType: "DATE", metadataId: "ORDER_DATE",...}
        criteria: {metadataDataType: "DATE", selection: "LAST_TRADING_DAY",
fromDate: null, toDate: null, days: null}
          days: null
          fromOate: null
          metadataDataType: "DATE"
          selection: "LAST_TRADING_DAY"
          toDate: null
      metadataDataType: "DATE"
      metadataId: "ORDER_DATE"
  filterId: " "
  firstRowNum: 0
  jumpSize: 0
  master: falst
  numOfRows: 18
  offset: 0
  position: "top"
  rowId: null
  rowSelectionFilters: [{filterfields: [{metadataDataType: "MULTISELECT",
metadataId: "ORDER_MARKETCAPBUCKET",...},...]}]
    0: {filterFields: [{metadataDataType: "MULTISELECT", metadataId:
"ORDER_MARKETCAPBUCKET",...}
      filterFields: [{metadataDataType: "MULTISELECT", metadataId:
"ORDER_MRKETCAP8UCKET",...},...]
        0: {metadataDataType: "MULTISELECT", metadataId:
"ORDER_MARKETCAPBUCKET",...}
          criteria: {metadataDataType: "MULTISELECT", selection: ["8) Mid]}
            metadataDataType: "MULTISELECT"
            selection: ["B) Mid"]
              0: "B) Mid"
            metadataDataType: "MULTISELECT"
            metadataId: "ORDER_MARKETCAPBUCKT"
      1: {metadataDataType: "MULTISELECT", metadataId: "ORDER_SIDE",...}
      2: {metadataDataType: "MULTISELECT", metadataId: "ORDER_PRICEBUCKET",...}
  sectionSizes:[ ]
  sourceId: "P_2538402_ordergrid_record_WAR_ftcaportlet_DLG_3db091f6-f67f-497c
aac3-b1721050552b"
  targetFilter: {filterFields: [ ]}
    filterFields: [ ]
  targetMaster: false
  traceType: "DEFAULT"
  transactionID: "6"
  view: {id: "localviewitem", name : "Default View", owner: "8888000002", type:
"SESSION",comment: " ",...}
  viewID: " "
```

The database may return the requested data using a data response 541. In one implementation, the data response may utilize a different datasetId from the datasetId in the data request. The new datasetId returned in the data response, which corresponds to the dataset in the data response, may be passed by Component B as a data source parameter to slave and/or masterless UI view components that handle event messages emitted by Component B. For example, the data response may include JSON-formatted data as provided below:

{totalRowCount: 1, totalExportCount: 1, firstRowNum:0, datasetId:"500398723158599000",_}
datasetId:"500398723158599000"
firstRowNum:0
gridReady:true
rows: [,_]
  0:{info:{rowId: "2015.11.0614", rowType:"D", sectionId: "rr", sectionDone: true, sectionCount:1},_}
    data:{ORDER_PWP10INLIMITBPS: 1.2982250820405261, OROER_DATE: 1446786000000,
    ORDER_SIDE: "Sell", . . . }
    ORDER_ACCOUNT: "001270121"
ORDER_CLIENTNAME: "Retail FDLM Test client"
ORDER_OATE: 1446786000000
ORDER_EXECUTEDPRICE: 26.991918518518517
ORDER_EXECUTEDQUANTITY: 1350
ORDER_EXECUTEDVALUE: 36439.09
ORDER_FILLRATE: 100
ORDER_INTERVALVWAPINLIMITBPS: 1.9881971822158697
ORDER_ISROOT: true
ORDER_ORDERQUAUTITY: 1350
ORDER_PARTICIPATIONRATEINLIMIT: 52.285050348567
ORDER_PCTVOLUMEINLIMIT:100
ORDER_PWP10INLIMITBPS: 1.2982250820405261
ORDER_PWP20INLIMITBPS: 1.9955083221369754
ORDER_PWP30INLIMITBPS: 2.637973421580462
ORDER_PWP40INLIMITBPS: 2.558B963400109974

```
    ORDER_PWP50INLIMITBPS:
        2.094343734873824
    ORDER_SIDE:•"sell"
    ORDER_STARTDATETIMELOCAL:
        1446821431227
    ORDER_STARTMIDPOINTINLIMITBPS:
        −1.141500826627284
    ORDER SYMBOL: "TE"
    ODER_TCAORDERID:
        "RouteHub_20151106_192px_16745_94656"
    ORDER_TCAROOTORDERID:
        "RouteHub_20151106_192px_16745_94656"
    ORDER_TRADERNAME: null
    ORDER_UNEXECUTEDQUANTITY: 0
info: {rowId: "2015.11.0614'", rowType: "D", sectionId:
    "rr", sectionDone: true, sectionCount: 1}
    rowId: "2015.11.0614"
    rowType: "D"
    sectionCount: 1
    sectionDone: true
    sectionId: "rr"
    totalExportCount: 1
    totalRowCount: 1
    transactionId: "6"
```

Component B's updated visuals 545 may be sent to the user. For example, Component B may be a grid, and an updated grid showing data corresponding to the user's selection may be displayed to the user. In some implementations, a default item (e.g., the first row) may be automatically selected in the updated visualization.

Component B may be informed regarding the automatic selection of the default row and may act as one of the emitters 504 to broadcast an event message on the channel. Accordingly, Component B may utilize a UIVCME component 549 to generate and emit an event message 553. See FIG. 6 for additional details regarding the UIVCME component. For example, this event message may use the same format as event message 529.

Another UI view component Component C may act as one of the receivers 506, to receive and handle event message 553 (e.g., Component C may be a slave of Component B, Component C may be a masterless receiver on Component B's channel that can handle Component B's event messages). Accordingly, Component C may utilize a UIVCMP component 557 to update Component C's visualization. See FIG. 7 for additional details regarding the UIVCMP component.

Component C may send (e.g., via a browser) a data request 561 to the database to retrieve data utilized to update Component C's visualization. For example, this data request may use the same format as data request 537. In one implementation, data request 561 may include the new datasetId returned in the data response 541 (e.g., Component B may pass the new datasetId to Component C in event message 553) to specify the starting dataset.

The database may return the requested data using a data response 565. For example, this data response may use the same format as data response 541. In one implementation, data response 565 may utilize a different datasetId from the datasetId in data request 561.

Component C's updated visuals 569 may be sent to the user. For example, Component C may be a chart, and an updated chart showing data corresponding to the default selection in Component B may be displayed to the user.

This chain of emitting event messages and updating visualizations may continue (e.g., Component C may act as an emitter and broadcast an event message that may be handled by Component D acting as a receiver) in accordance with the taxonomy that is in effect for the channel.

Figure 6:
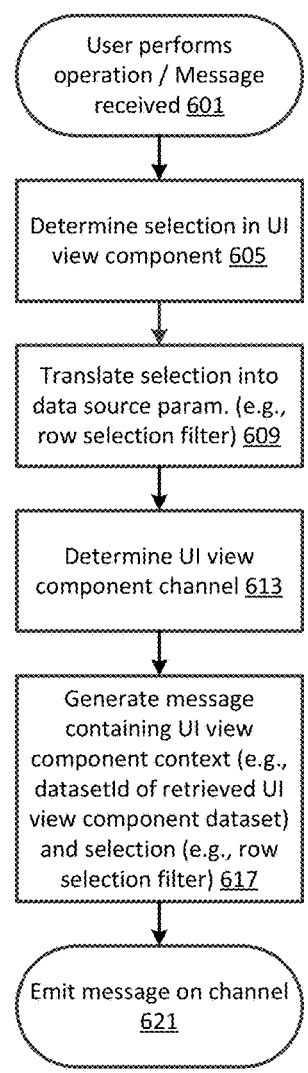
FIG. 6 shows a logic flow diagram illustrating embodiments of a UI view component message emitting (UIVCME) component for the UIPDCA.

FIG. 6 shows a logic flow diagram illustrating embodiments of a UI view component message emitting (UIVCME) component for the UIPDCA. In FIG. 6, a user may perform an operation on (e.g., the user may select a row) and/or a message may be received by (e.g., a row selection event associated with automatic selection of a default row after a visualization update) a UI view component at 601.

The selection in the UI view component may be determined at 605. In one implementation, a row selection event of a grid may be parsed to determine the row selected in the UI view component. In another implementation, a selection event of a chart may be parsed to determine the selection (e.g., the selected piece of a pie chart) in the UI view component.

The selection may be translated into a data source parameter (e.g., row selection filter) for a query at 609. For example, the identifier of the order associated with a selected row may be used in the data source parameter. In another example, a dataset associated with a selected piece of a pie chart may be used in the data source parameter. In one implementation, a translation function may be utilized to make the translation. For example, the translation function may take orderId as an input and output "id: orderId" as a string to be used in an event message that includes JSON-formatted data.

The channel associated with the UI view component may be determined at 613. In one implementation, a configuration setting associated with the UI view component may be checked to make this determination (e.g., based on data in an associated UI view component data structure).

An event message containing UI view component context (e.g., datasetId of the UI view component's dataset, filters associated with the UI view component) and the selection (e.g., the row selection filter) may be generated at 617. In one implementation, the event message may be generated in accordance with a schema that specifies fields for the event message and using relevant context data.

The event message may be emitted on the channel associated with the UI view component at 621. In one implementation, the event message may be broadcast through the system, and may include the identifier of the emitting UI view component (e.g., portletId) and the channel (e.g., channel 1).

Figure 7:
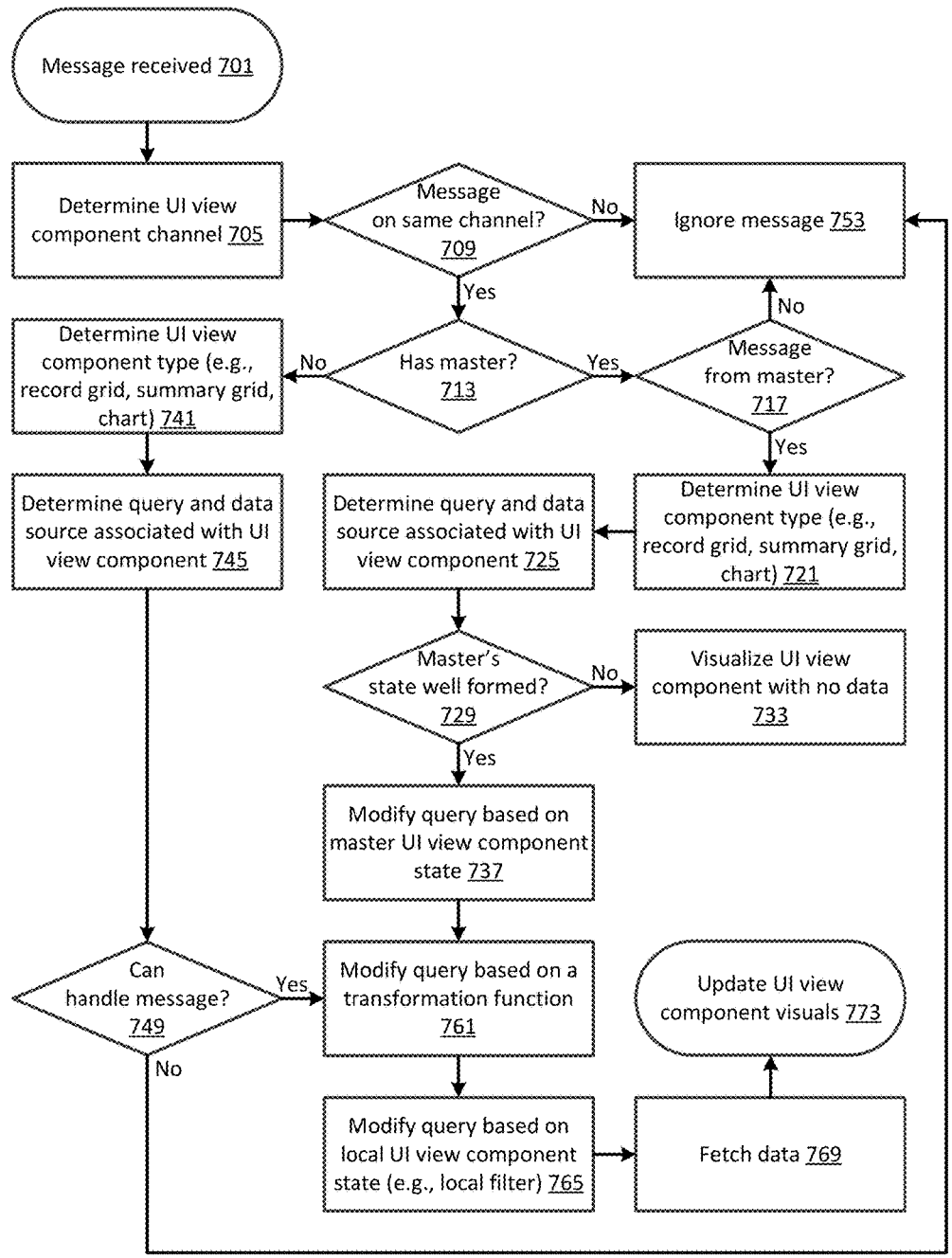
FIG. 7 shows a logic flow diagram illustrating embodiments of a UI view component message processing (UIVCMP) component for the UIPDCA.

FIG. 7 shows a logic flow diagram illustrating embodiments of a UI view component message processing (UIVCMP) component for the UIPDCA. In FIG. 7, an event message may be received by a UI view component at 701.

The channel associated with the UI view component may be determined at 705. In one implementation, a configuration setting associated with the UI view component may be checked to make this determination (e.g., based on data in an associated UI view component data structure).

A determination may be made at 709 whether the received event message was emitted on the same channel as the channel associated with the UI view component. In one implementation, the event message may be parsed to determine its channel (e.g., channel 1), and the channel of the event message may be compared to the channel associated with the UI view component (e.g., channel 1) to make this determination. If the message is not on the same channel, the UI view component may ignore the event message at 753.

If the message is on the same channel, a determination may be made at 713 whether the UI view component has a master. In one implementation, this determination may be made based on a configuration setting associated with the UI view component. If the UI view component has a master, a determination may be made at 717 whether the message came from the master. In one implementation, the event message may be parsed to determine the identifier of the UI view component that emitted the event message (e.g., portletId), and the emitter's identifier may be compared to the identifier of the UI view component's master to check whether they match. If the message did not come from the UI view component's master, the UI view component may ignore the event message at 753.

If the message came from the UI view component's master, the UI view component type of the UI view component may be determined at 721. The UI view component type may specify the visualization associated with the UI view component. In various implementations, UI view component types may include grid types (e.g., order record grid, summary grid, execution record grid, execution summary grid), chart types (e.g., single order chart, order summary chart, execution summary chart), diagnostics, text, and/or the like. For example, the UI view component type may be determined based on a configuration setting associated with the UI view component (e.g., based on data in an associated UI view component data structure).

A query associated with the UI view component may be determined at 725. The query may specify how to retrieve data for the visualization associated with the UI view component. In one implementation, the query may be determined based on the identifier of the visualization. For example, the query may be determined based on data in an associated UI view component data structure. The query may be modified based on a data source parameter provided in the event message (e.g., one or more of identifier of a table to use to retrieve data, datasetId of the dataset to use, a row selection filter).

A determination may be made at 729 whether the master's state is well formed (e.g., based on whether data regarding the master's state is valid). If the master's state is not well formed, the UI view component may be visualized with no data at 733). In one implementation, an error may be logged indicating a problem with the master's state.

If the master's state is well formed, the query may be modified based on the master UI view component state at 737. In one implementation, a filter associated with the master may be determined based on a query modifier parameter provided in the event message, and the query may be modified based on the master's filter.

If the UI view component does not have a master, the UI view component type of the UI view component may be determined at 741. The UI view component type may specify the visualization associated with the UI view component. In various implementations, UI view component types may include grid types (e.g., record grid, summary grid, order grid), chart types (e.g., order chart, summary chart), diagnostics, text, and/or the like. For example, the UI view component type may be determined based on a configuration setting associated with the UI view component (e.g., based on data in an associated UI view component data structure).

A query associated with the UI view component may be determined at 745. The query may specify how to retrieve data for the visualization associated with the UI view component. In one implementation, the query may be determined based on the identifier of the visualization. For example, the query may be determined based on data in an associated UI view component data structure. The query may be modified based on a data source parameter provided in the event message (e.g., one or more of identifier of a table to use to retrieve data, datasetId of the dataset to use, a row selection filter).

A determination may be made at 749 whether the UI view component can handle the event message (e.g., does modifying the query based on a data source parameter provided in the event message result in a valid query that retrieves data that can be visualized by the UI view component). In various implementations, this determination may be made based on data provided in the event message and/or information regarding the query. For example, a presentation field of the event message may be checked (e.g., the presentation field may specify "SUMMARY_GRID" to indicate that a summary grid visualization should be used to present data). If the visualization type specified in the event message matches the UI view component type of the UI view component, then the UI view component can handle the event message. In another example, configuration settings associated with the query may specify which data fields should be specified in the event message in order to form a valid query. If the event message specifies at least these data fields, then the UI view component can handle the event message. If the UI view component cannot handle the event message, the UI view component may ignore the event message at 753.

If the UI view component can handle the event message at 749 or if the master's state is well formed and the query is modified based on the master UI view component state at 737, the query may be modified based on a transformation function at 761. A transformation function (e.g., traceType) may transform the query in accordance with a specified data retrieval method. For example, the query (e.g., a SQL statement) may be transformed into different SQL statements, may use different tables, may be recursive, and/or the like. In one implementation, transformation functions may include the following:

DEFAULT
do not apply any additional processing;
PARENTS—find parent orders
select * from order where RootOrderId in (select RootOrderId from dataset);
CHILDREN— find child orders
recursive select * from order where ParentOrderId in (select OrderId from dataset);
IMMEDIATE_PARENTS—find immediate parent orders
select * from order where OrderId in (select ParentOrderId from dataset);
IMMEDIATE CHILDREN—find immediate child orders
select * from order where ParentOrderId in (select OrderId from dataset);
STREET SIDE—find street side orders
select * from order where RootOrderId in (select RootOrderId from dataset) and venue !=null;
ALGORITHMIC_COMPONENTS—find algorithmic components
select * from order where RootOrderId in (select RootOrderId from dataset) and parentOrderType=='ALGORITHM' and component !=null;

In one implementation, the transformation function to use for the UI view component may be determined based on user selection.

The query may be modified based on the local UI view component state of the UI view component at 765. In one implementation, a local filter associated with the UI view component may be determined based on user selection, and the query may be modified based on the local filter.

Data used to generate the visualization associated with the UI view component may be fetched at 769. In one implementation, the query may be sent (e.g., via a PHP page) to a database server that returns the requested data. In another implementation, parameters for a query may be determined and sent from a web page associated with the UI view component (e.g., using JSON) to an application server, which may generate a SQL query, send the SQL query to a database server to obtain the requested data, and return the requested data (e.g., using JSON) to the web page.

The visualization of the UI view component may be updated using the fetched data at 773. For example, a grid, a chart, a text page, and/or the like may be visualized to show the obtained data in proper format for the visualization.

Figure 8:
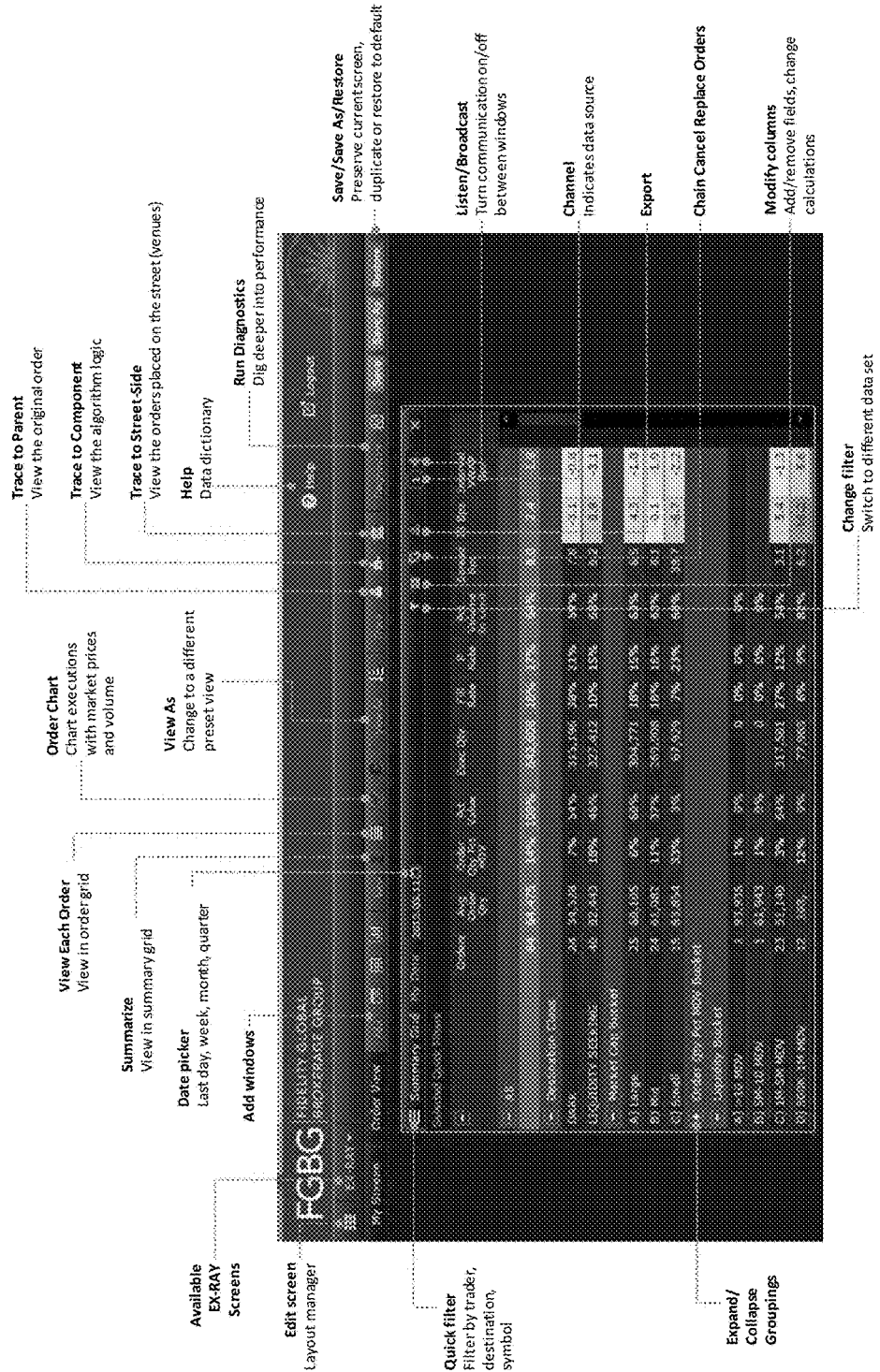
FIG. 8 shows a screenshot diagram illustrating embodiments of the UIPDCA.

FIG. 8 shows a screenshot diagram illustrating embodiments of the UIPDCA. As shown in FIG. 8, the edit screen widget may be used to load a layout manager to specify a set of UI view components to open for display. UI view components may also be opened using add windows widgets and/or view widgets. A transformation function may be specified using trace widgets. A user may control whether a UI view component broadcasts and/or listen for broadcasts using Listen/Broadcast widgets (e.g., a widget to the left of the channel controls whether the UI view controller listens for broadcasts, a widget to the right of the channel controls whether the UI view controller broadcasts). A user may specify a local filter using the quick filter widget.

Figure 9:
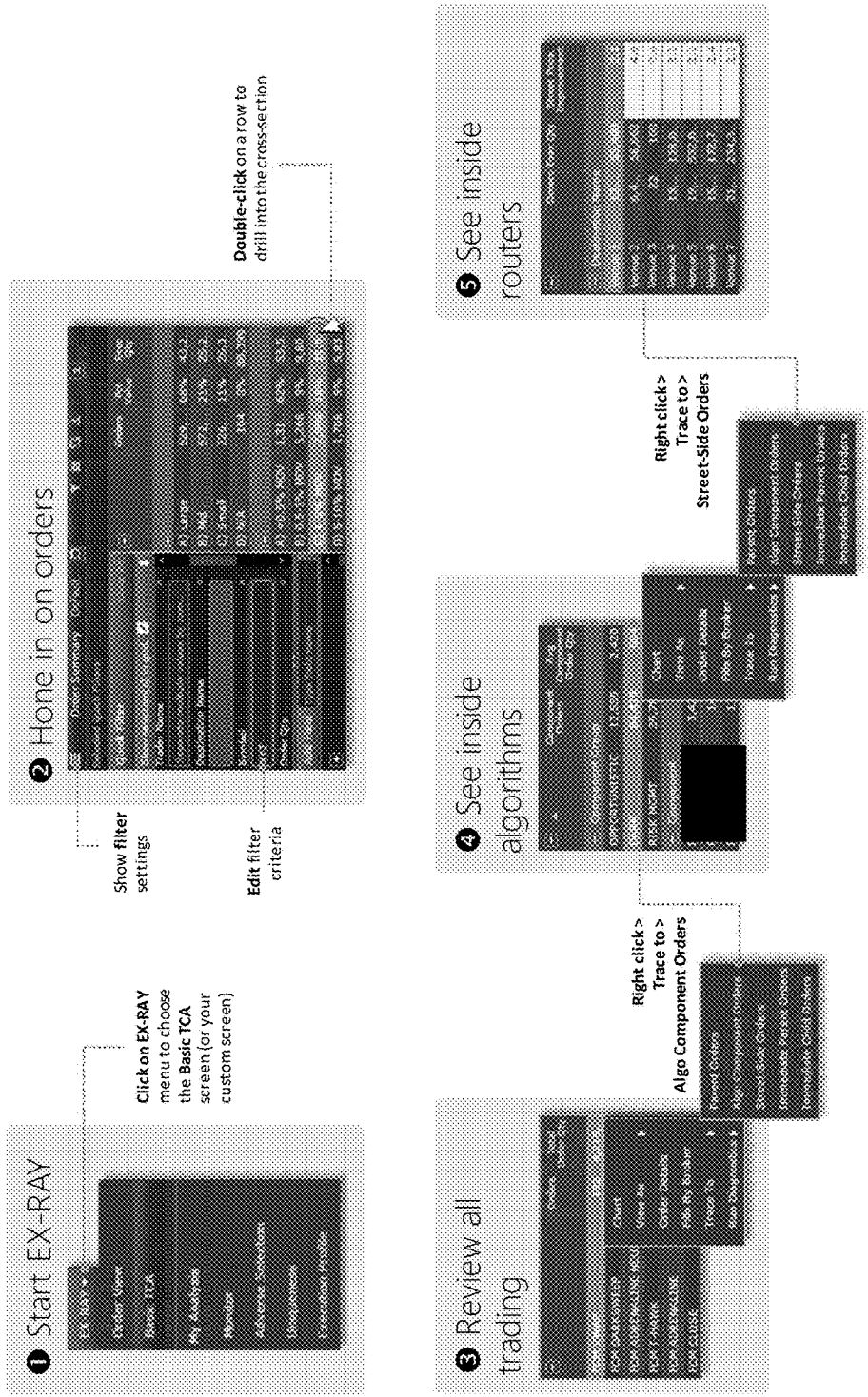
FIG. 9 shows a screenshot diagram illustrating embodiments of the UIPDCA.
Figure 10:
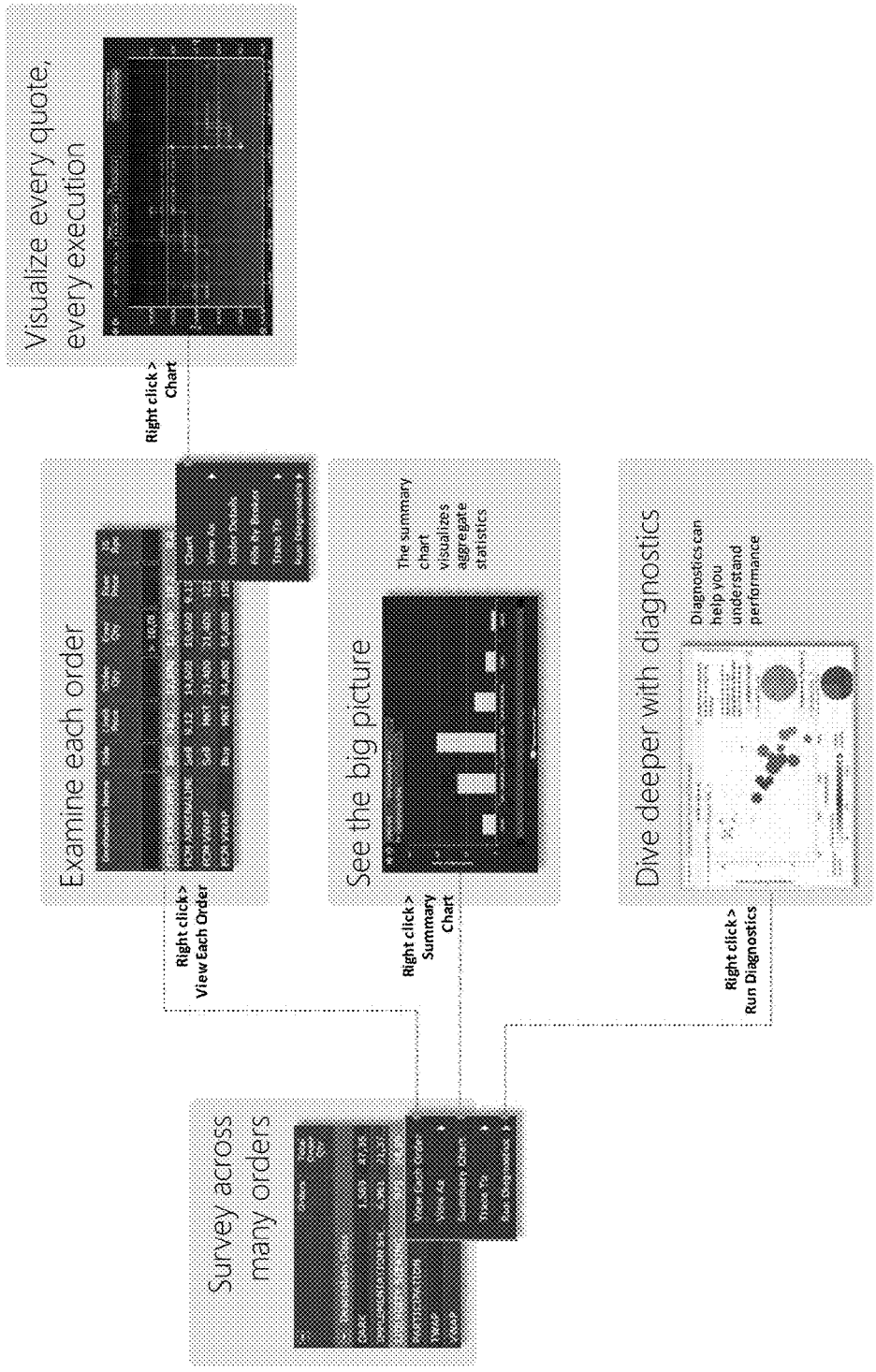
FIG. 10 shows a screenshot diagram illustrating embodiments of the UIPDCA.

FIGS. 9 and 10 show screenshot diagrams illustrating embodiments of the UIPDCA. In FIGS. 9 and 10, various ways in which a user may interact with the UIPDCA are shown.

Figure 11:
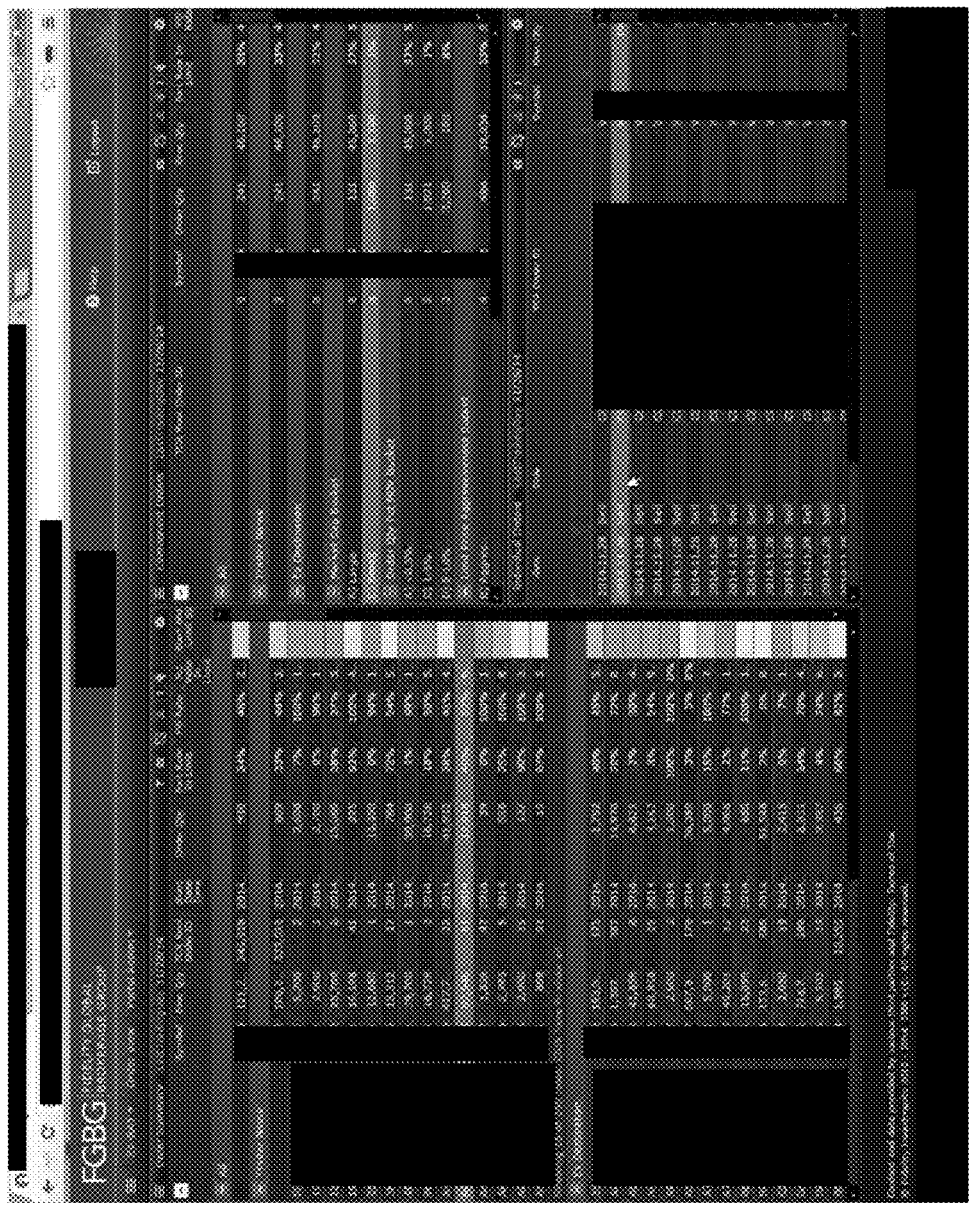
FIG. 11 shows a screenshot diagram illustrating embodiments of the UIPDCA.

FIG. 11 shows a screenshot diagram illustrating embodiments of the UIPDCA. In FIG. 11, a set of UI view components, including an Order Summary UI view component, a Component Orders UI view component and an Individual Orders UI view component, is shown.

Figure 12:
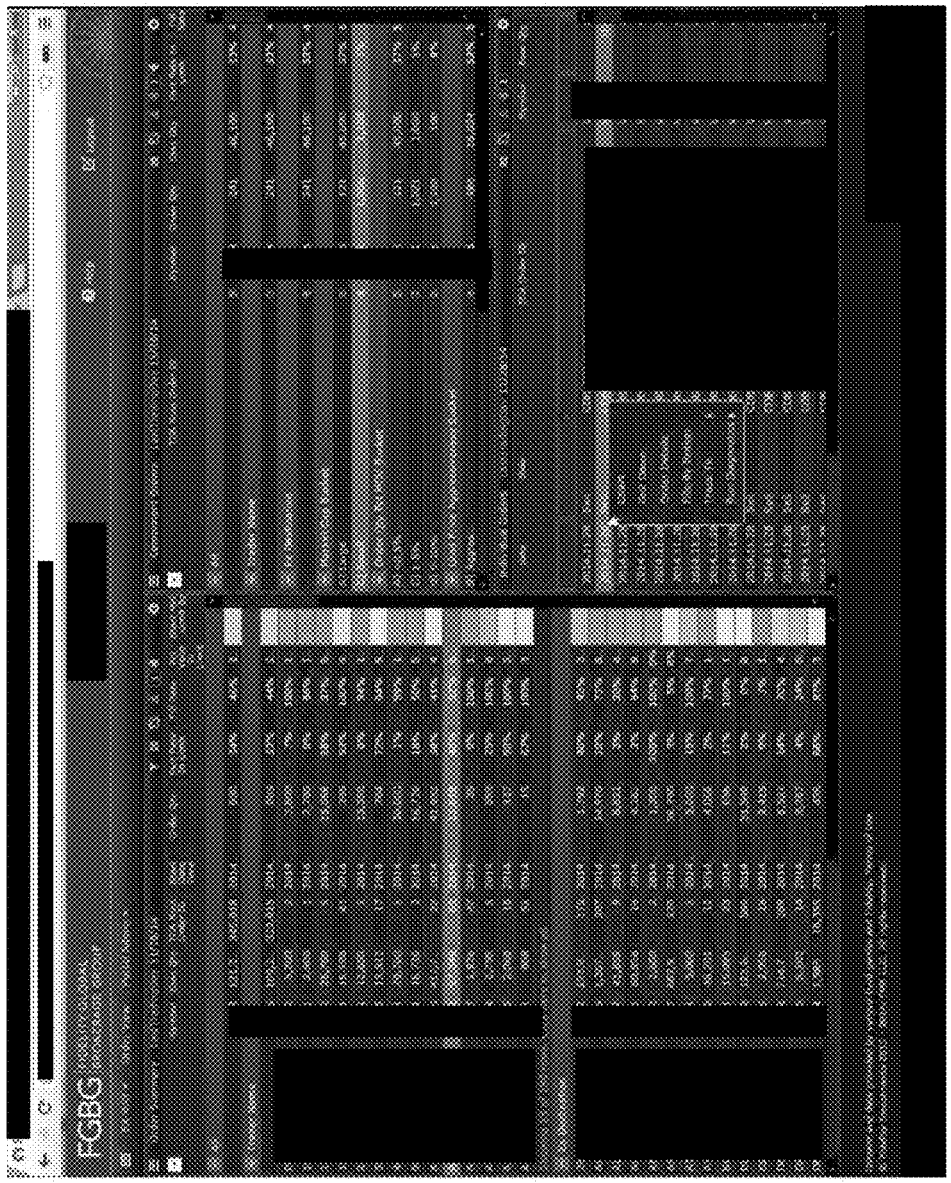
FIG. 12 shows a screenshot diagram illustrating embodiments of the UIPDCA.

FIG. 12 shows a screenshot diagram illustrating embodiments of the UIPDCA. In FIG. 12, a user may right click on an individual order to reveal a set of actions that the user may perform. For example, the user may indicate that a chart should be generated for the selected individual order.

Figure 13:
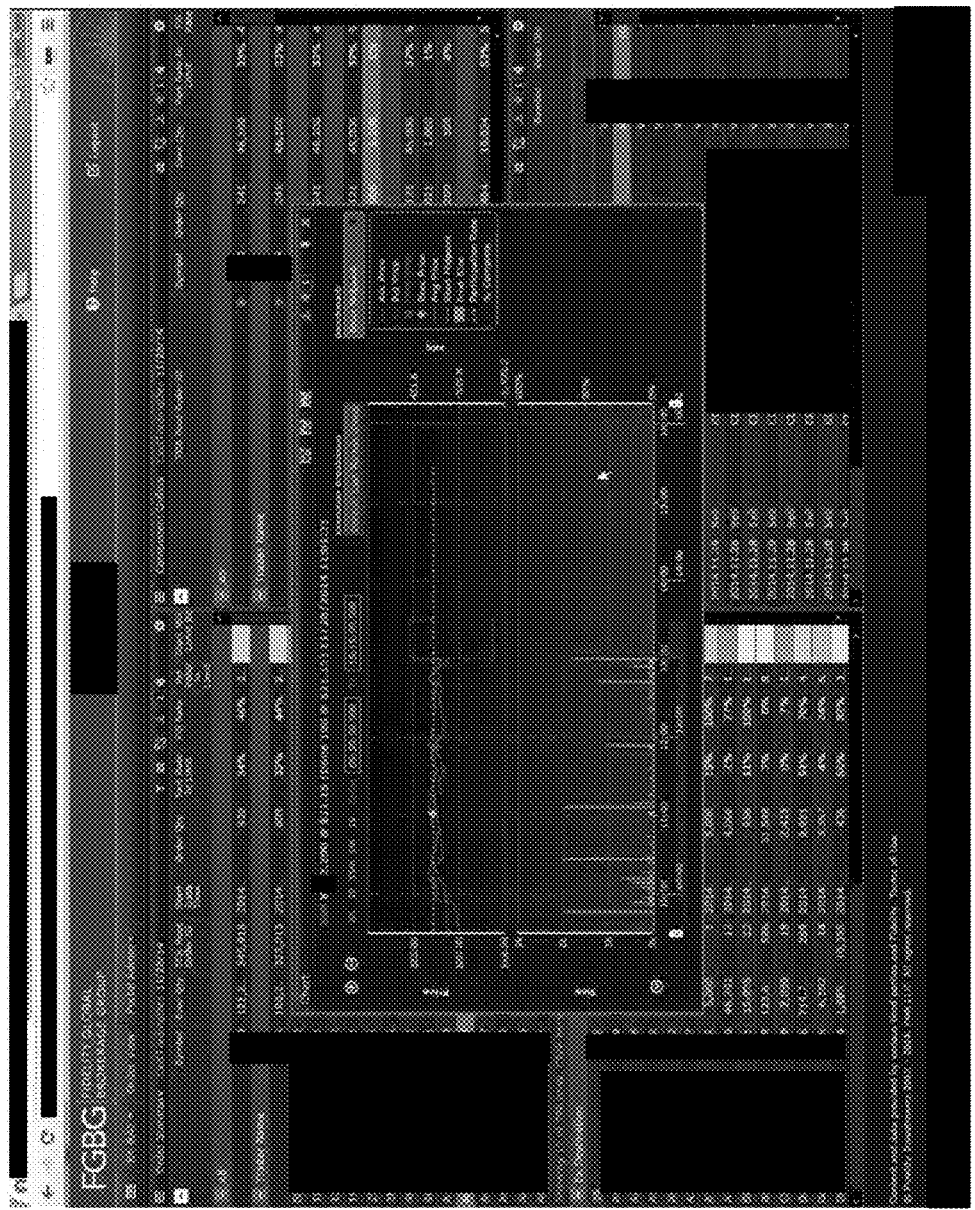
FIG. 13 shows a screenshot diagram illustrating embodiments of the UIPDCA.

FIG. 13 shows a screenshot diagram illustrating embodiments of the UIPDCA. FIG. 13 shows an example of a Chart UI view component that may be generated for the selected individual order from FIG. 12. The UI view components shown in FIG. 13 operate on channel 1 and may communicate with each other. For example, if a different individual order is selected in the Individual Orders UI view component, the Chart UI view component may be updated to show a chart for the newly selected individual order.

Figure 14:
FIG. 14 shows a screenshot diagram illustrating embodiments of the UIPDCA.

FIG. 14 shows a screenshot diagram illustrating embodiments of the UIPDCA. In FIG. 14, a layout manager is shown. A user may select a layout for display using the layout manager. A user may also edit a layout.

Figure 15:
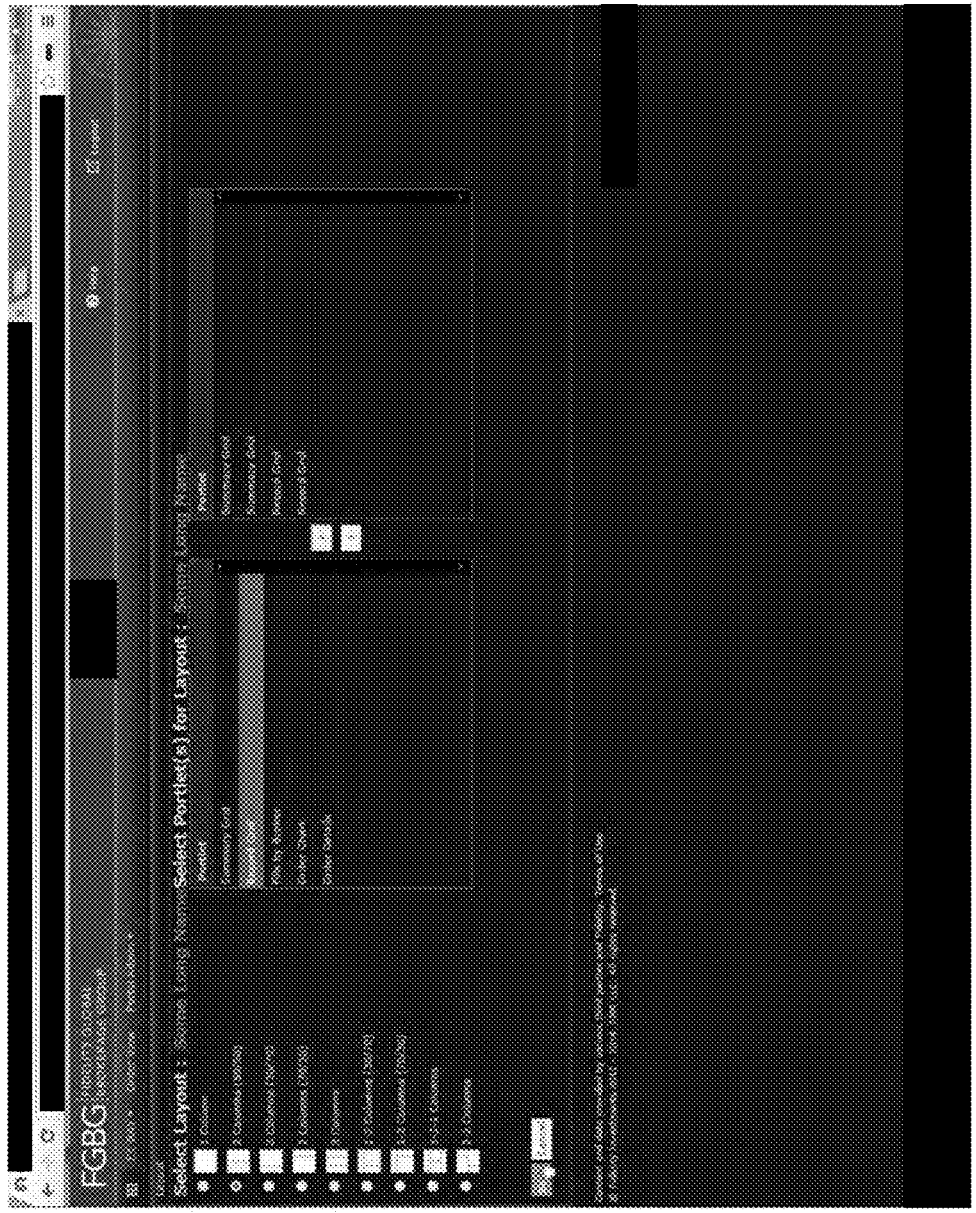
FIG. 15 shows a screenshot diagram illustrating embodiments of the UIPDCA.

FIG. 15 shows a screenshot diagram illustrating embodiments of the UIPDCA. FIG. 15 shows how a layout may be edited.

Figure 16:
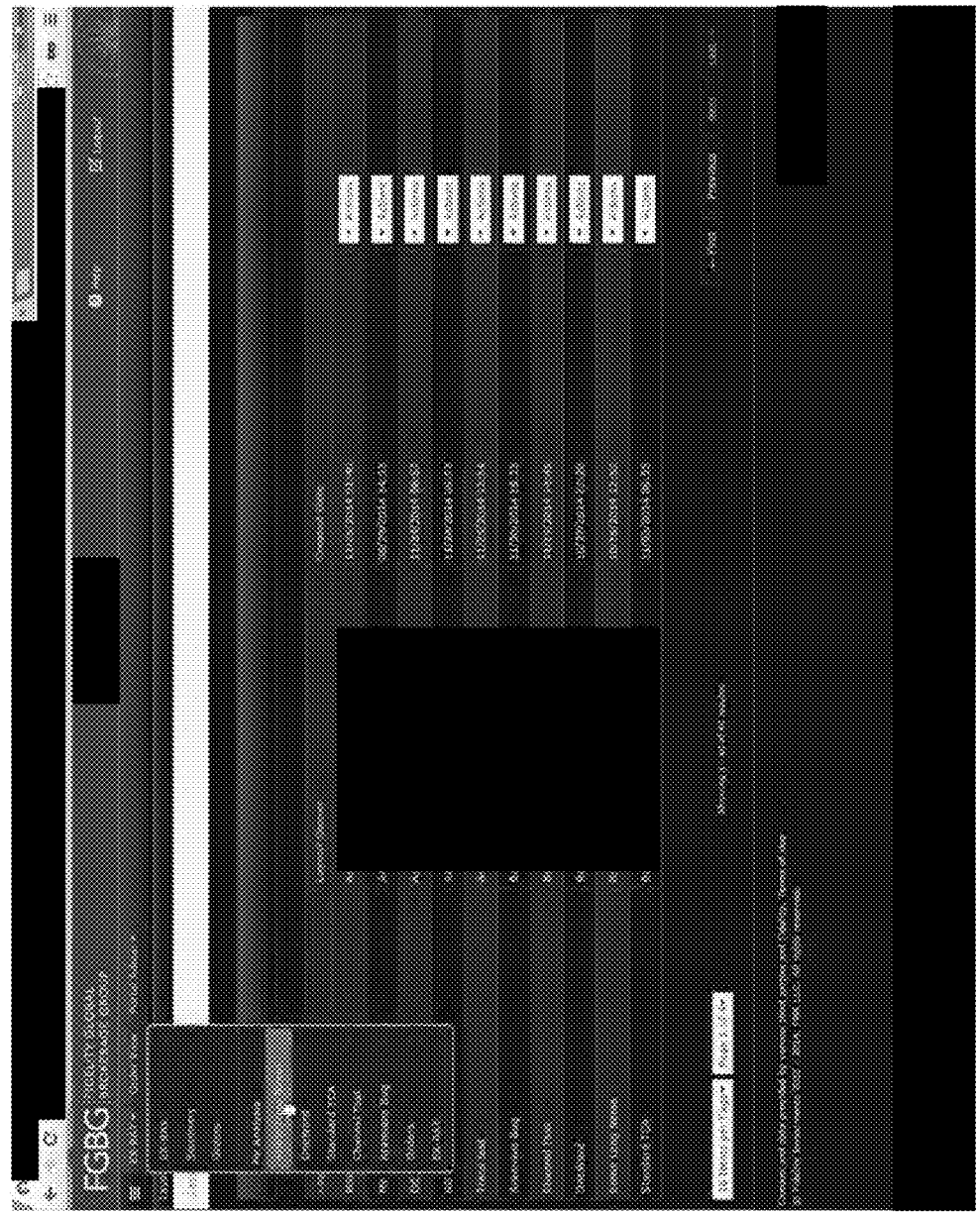
FIG. 16 shows a screenshot diagram illustrating embodiments of the UIPDCA.

FIG. 16 shows a screenshot diagram illustrating embodiments of the UIPDCA. FIG. 16 shows that the edited layout from FIG. 15 may be selected for display by a user.

Figure 17:
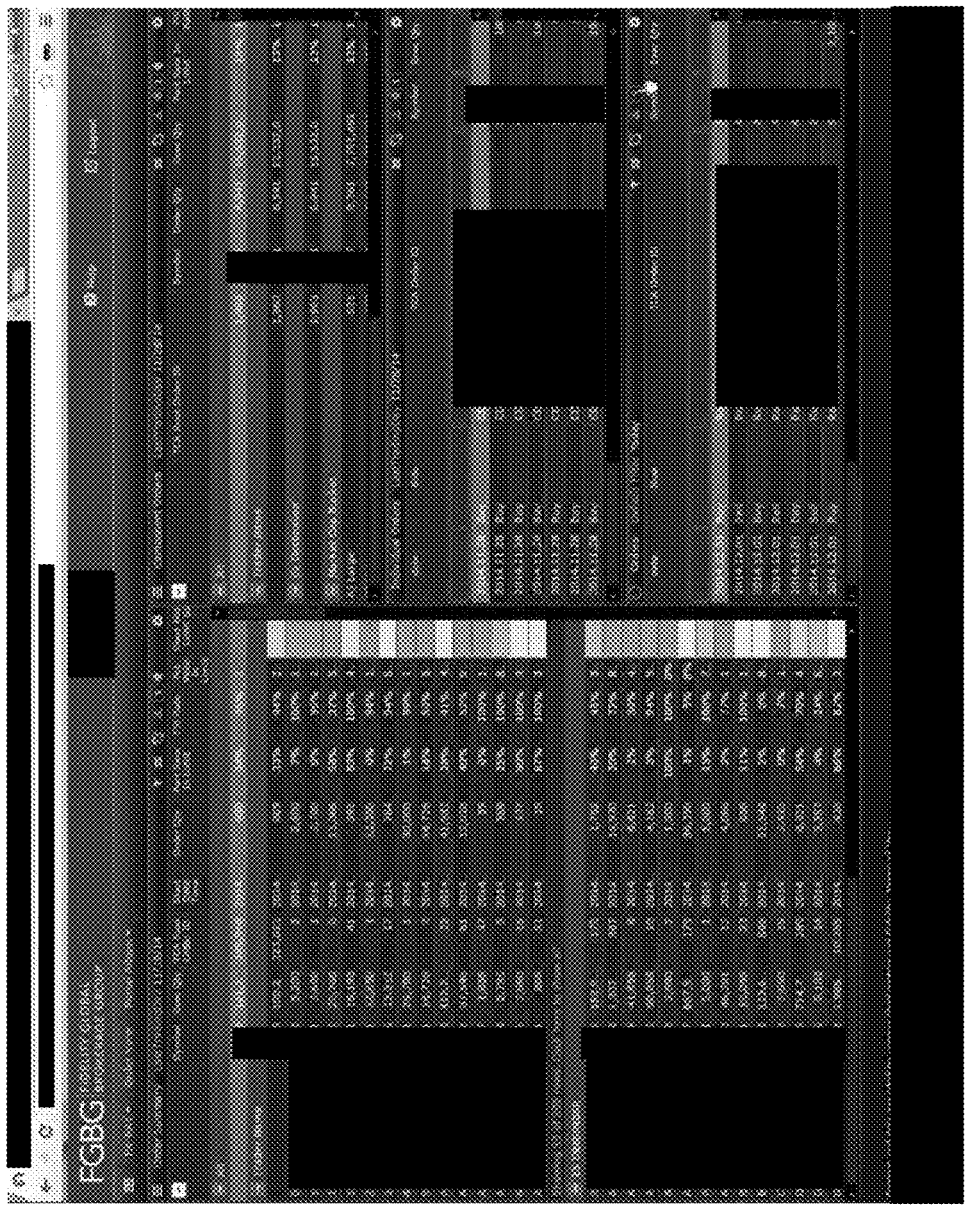
FIG. 17 shows a screenshot diagram illustrating embodiments of the UIPDCA.

FIG. 17 shows a screenshot diagram illustrating embodiments of the UIPDCA. In FIG. 17, the layout selected in FIG. 16 is shown to a user.

Figure 18:
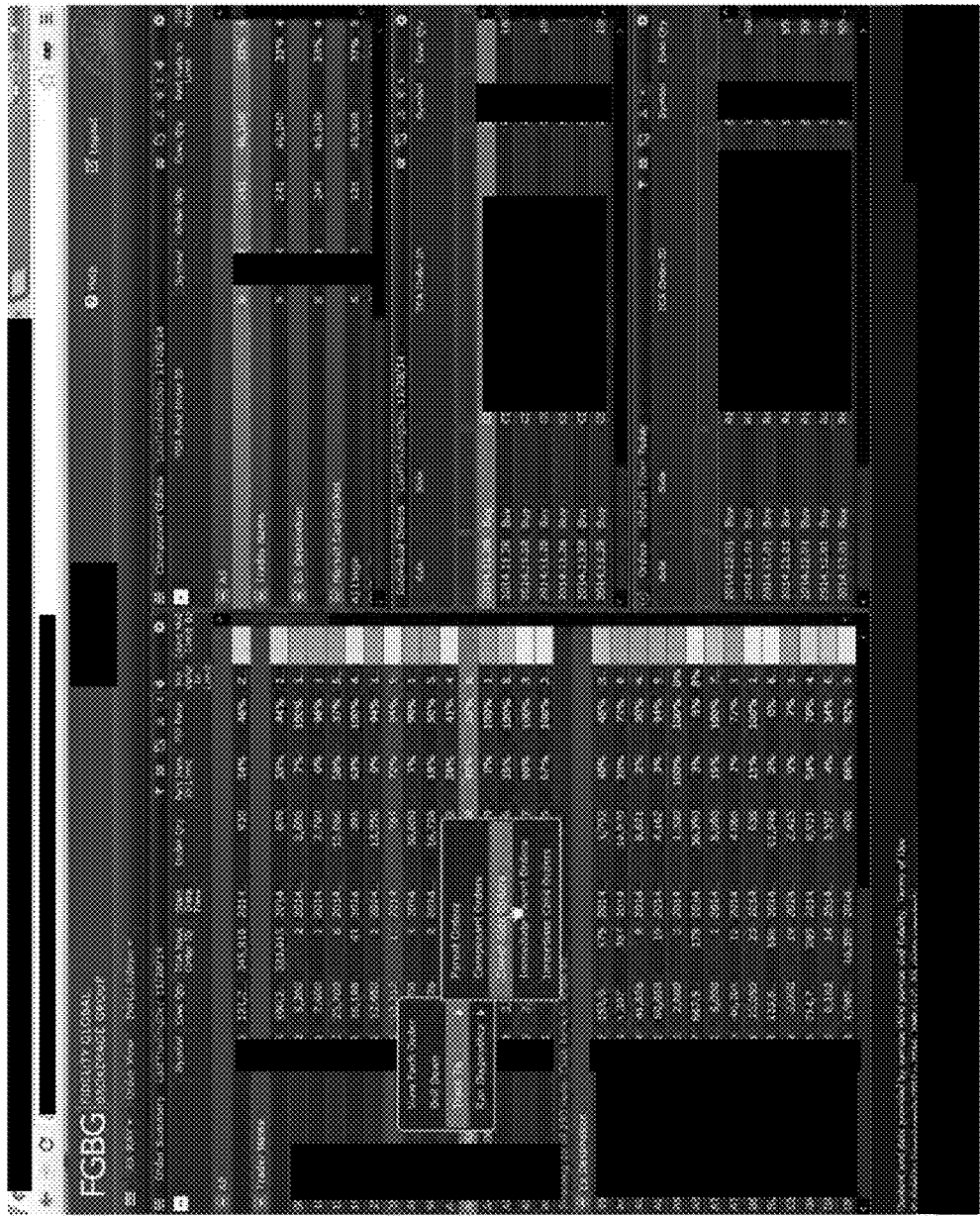
FIG. 18 shows a screenshot diagram illustrating embodiments of the UIPDCA.

FIG. 18 shows a screenshot diagram illustrating embodiments of the UIPDCA. In FIG. 18, a user may right click on a trader name and specify a trace that the user wishes to use.

Figure 19:
FIG. 19 shows a screenshot diagram illustrating embodiments of the UIPDCA.

FIG. 19 shows a screenshot diagram illustrating embodiments of the UIPDCA. In FIG. 19, a STREET_SIDE transformation function may be used to generate a visualization for a Street Side Order UI view component.

Figure 20:
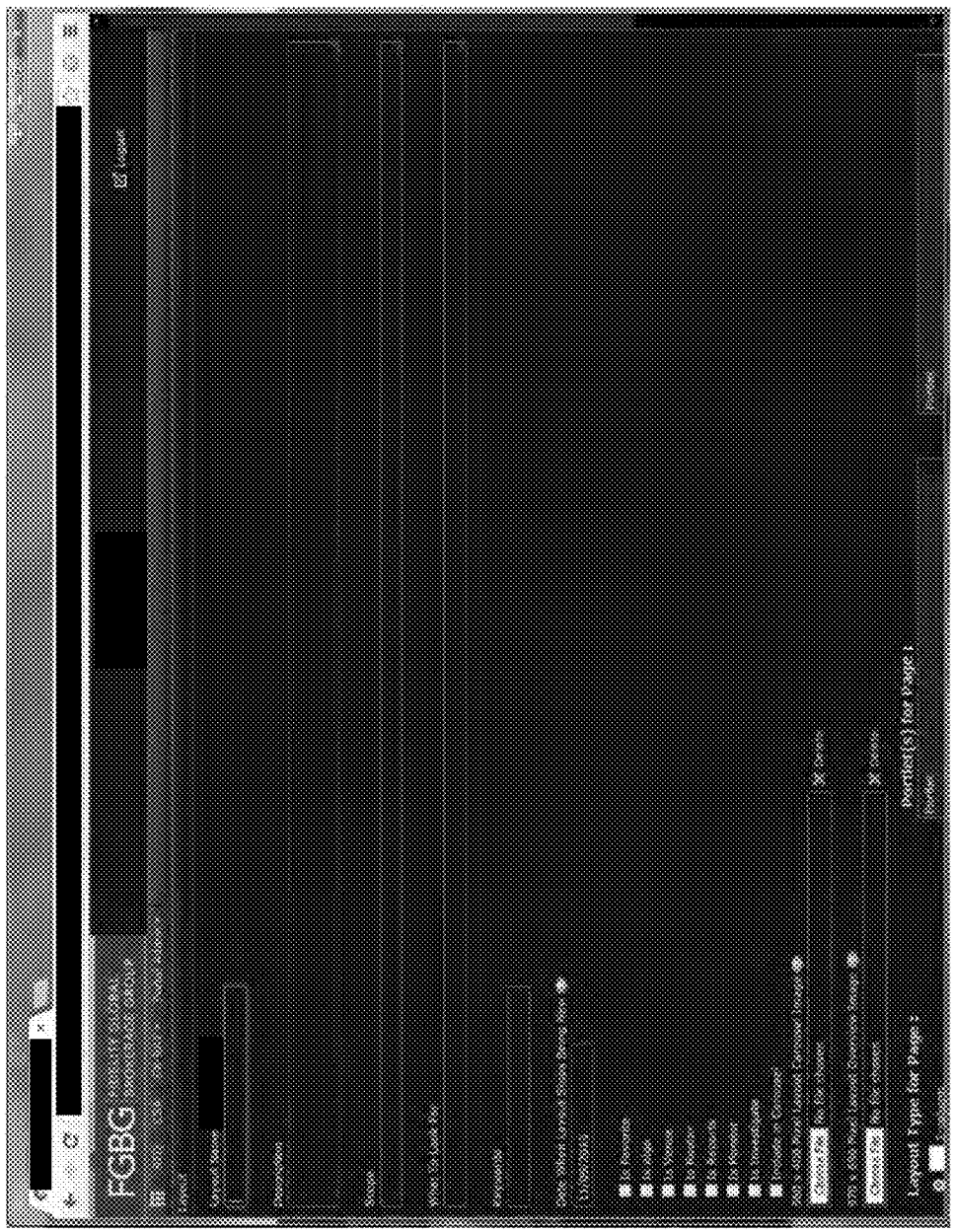
FIG. 20 shows a screenshot diagram illustrating embodiments of the UIPDCA.
Figure 21:
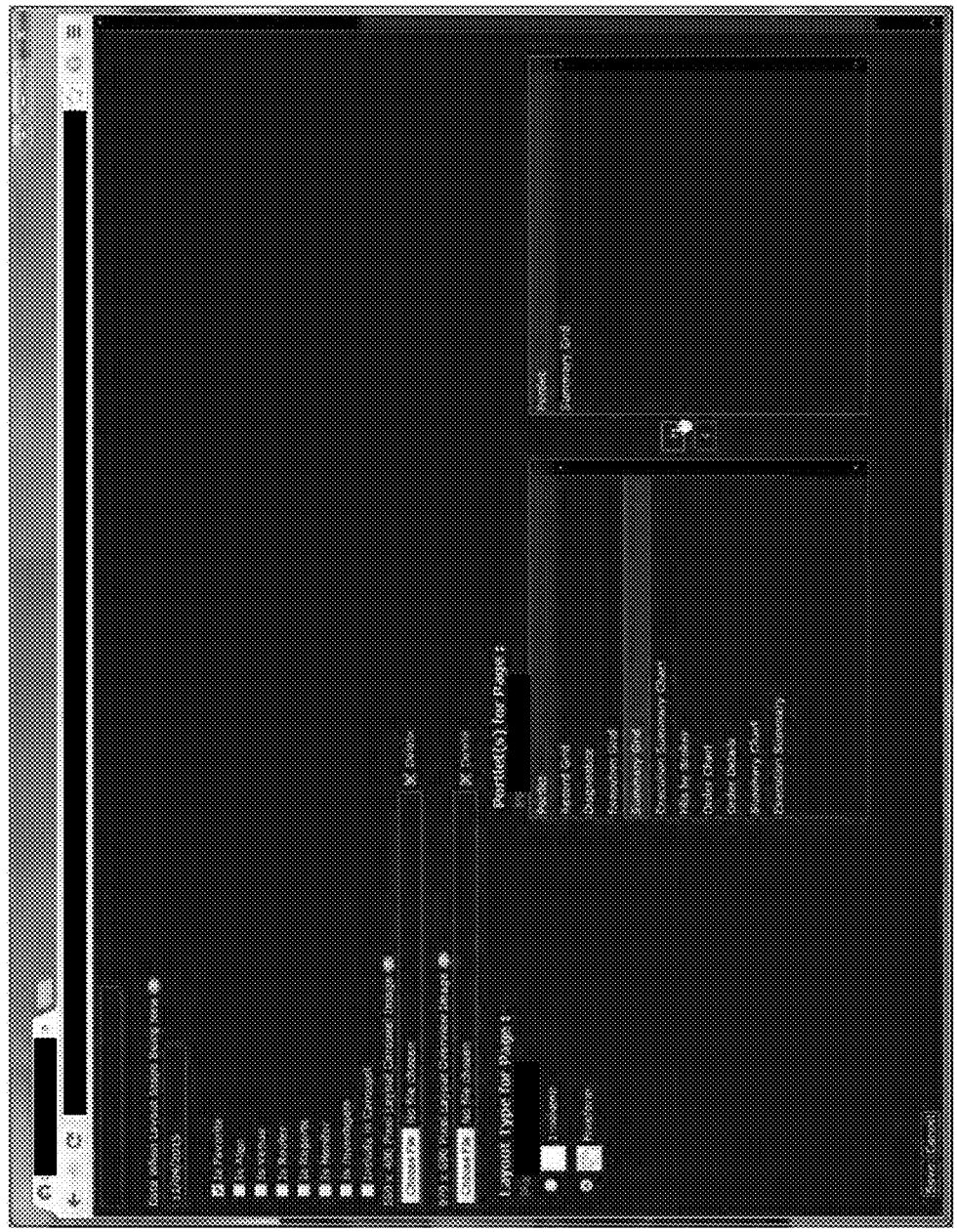
FIG. 21 shows a screenshot diagram illustrating embodiments of the UIPDCA.

FIGS. 20 and 21 show screenshot diagrams illustrating embodiments of the UIPDCA. FIGS. 20 and 21 show an alternative embodiment of a layout manager.

Figure 22:
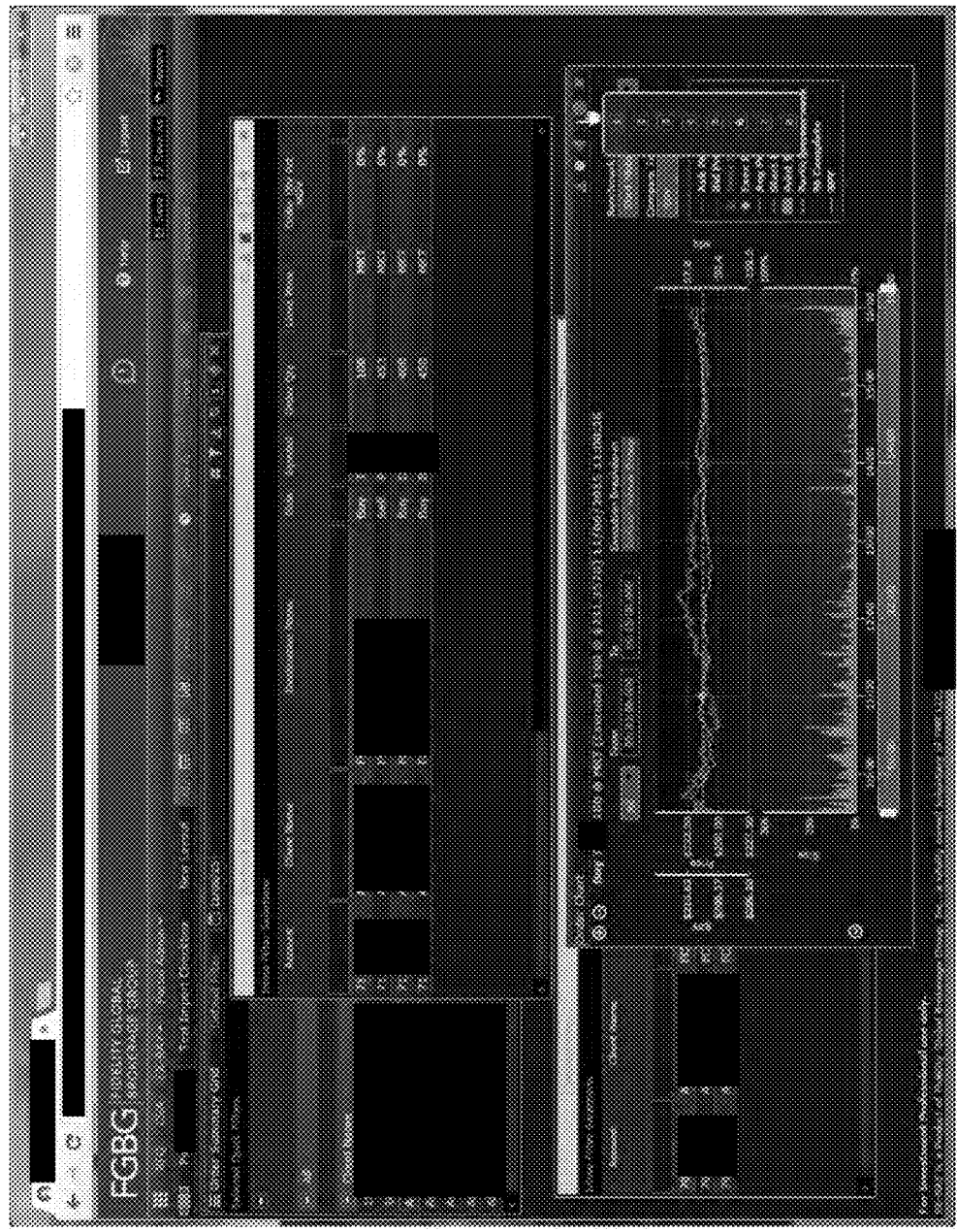
FIG. 22 shows a screenshot diagram illustrating embodiments of the UIPDCA.

FIG. 22 shows a screenshot diagram illustrating embodiments of the UIPDCA. FIG. 22 shows an Order Chart UI view component. A user may select the channel (e.g., 1 through 8) on which the Order Chart UI view component should operate.

Figure 23:
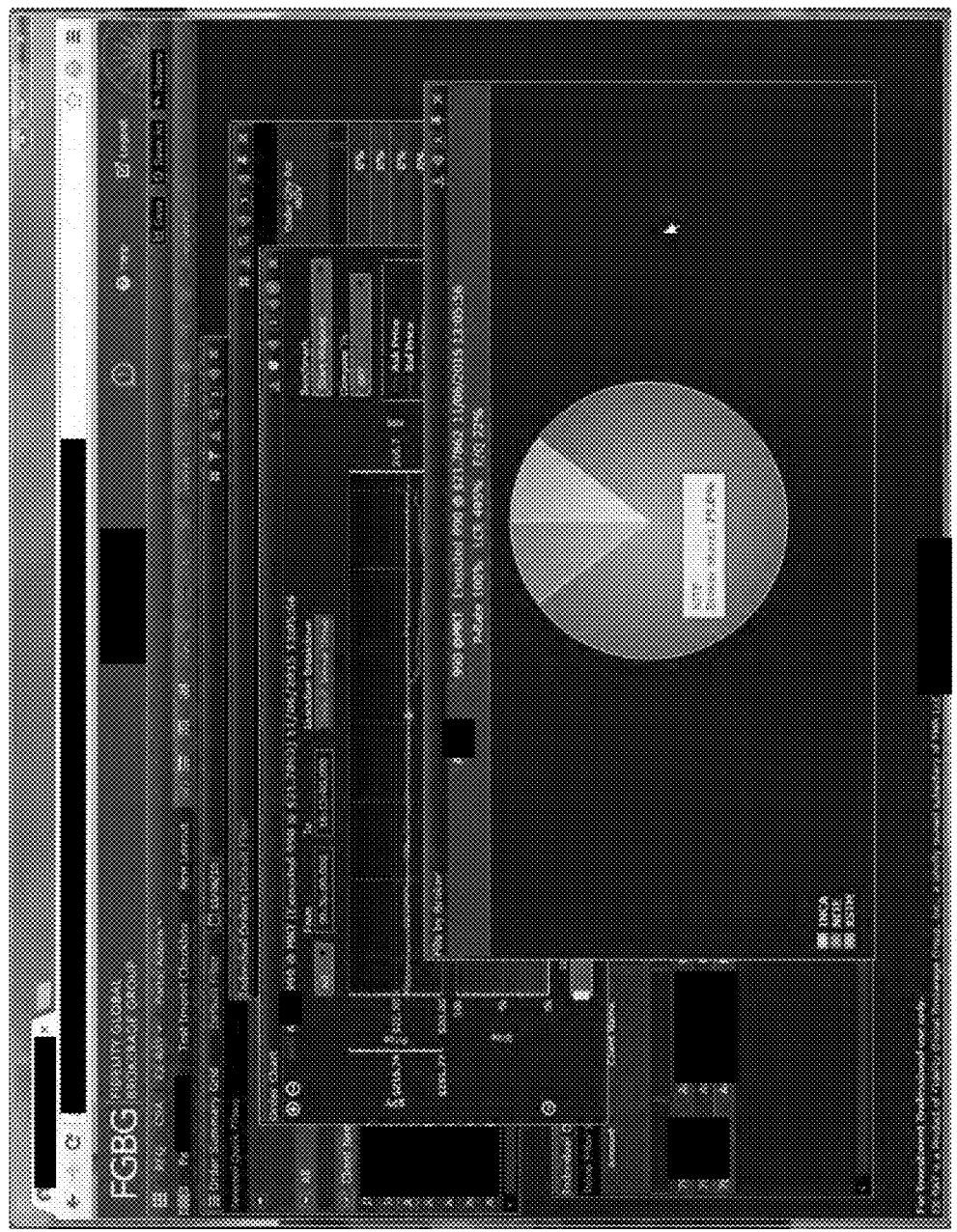
FIG. 23 shows a screenshot diagram illustrating embodiments of the UIPDCA.

FIG. 23 shows a screenshot diagram illustrating embodiments of the UIPDCA. FIG. 23 shows a Fills by Broker UI view component.

Figure 24:
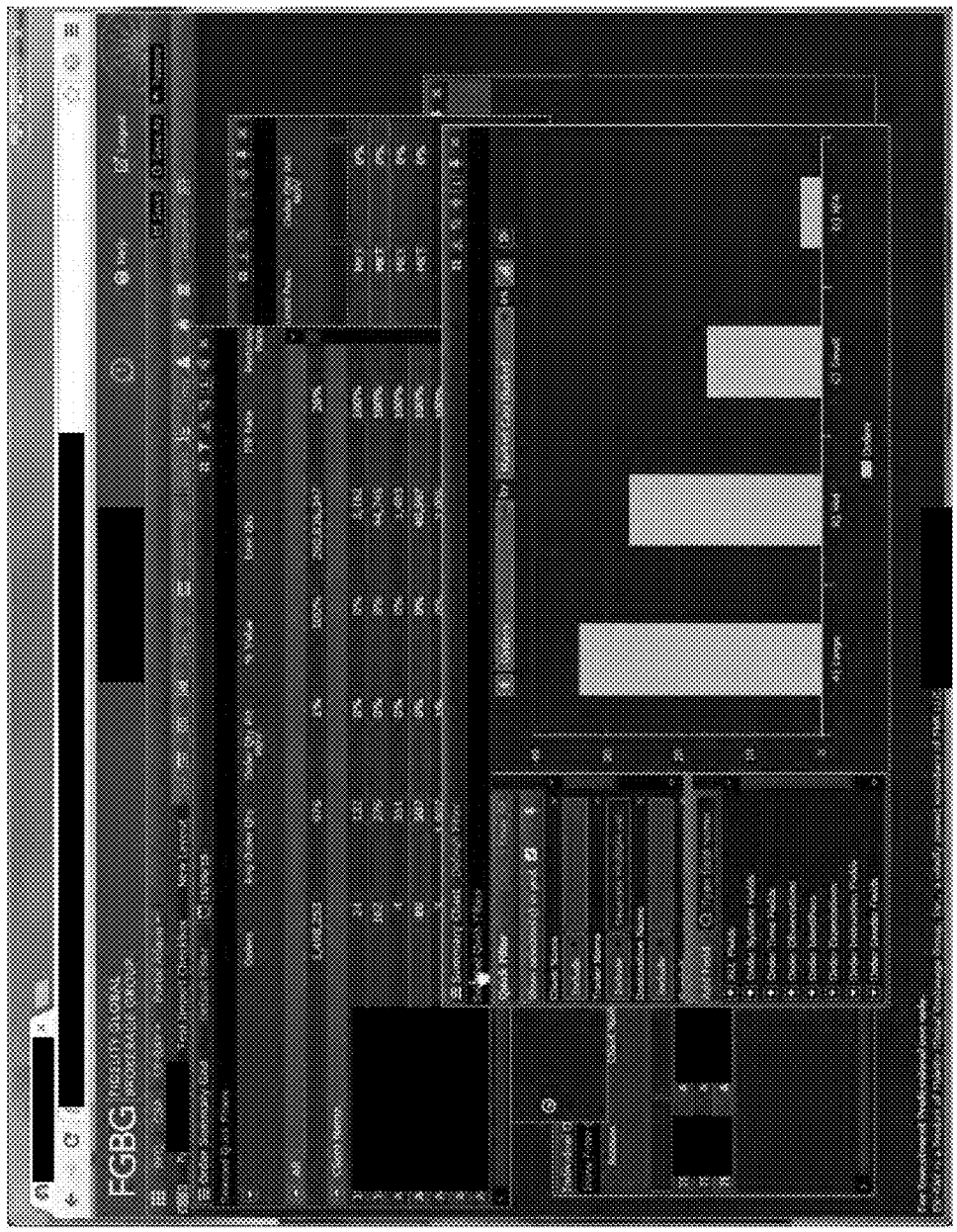
FIG. 24 shows a screenshot diagram illustrating embodiments of the UIPDCA.

FIG. 24 shows a screenshot diagram illustrating embodiments of the UIPDCA. In FIG. 24, a Summary Chart UI view component is shown. A user may select a local filter for the Summary Chart UI view component using the Quick Filter widget.

UIPDCA Controller

Figure 25:
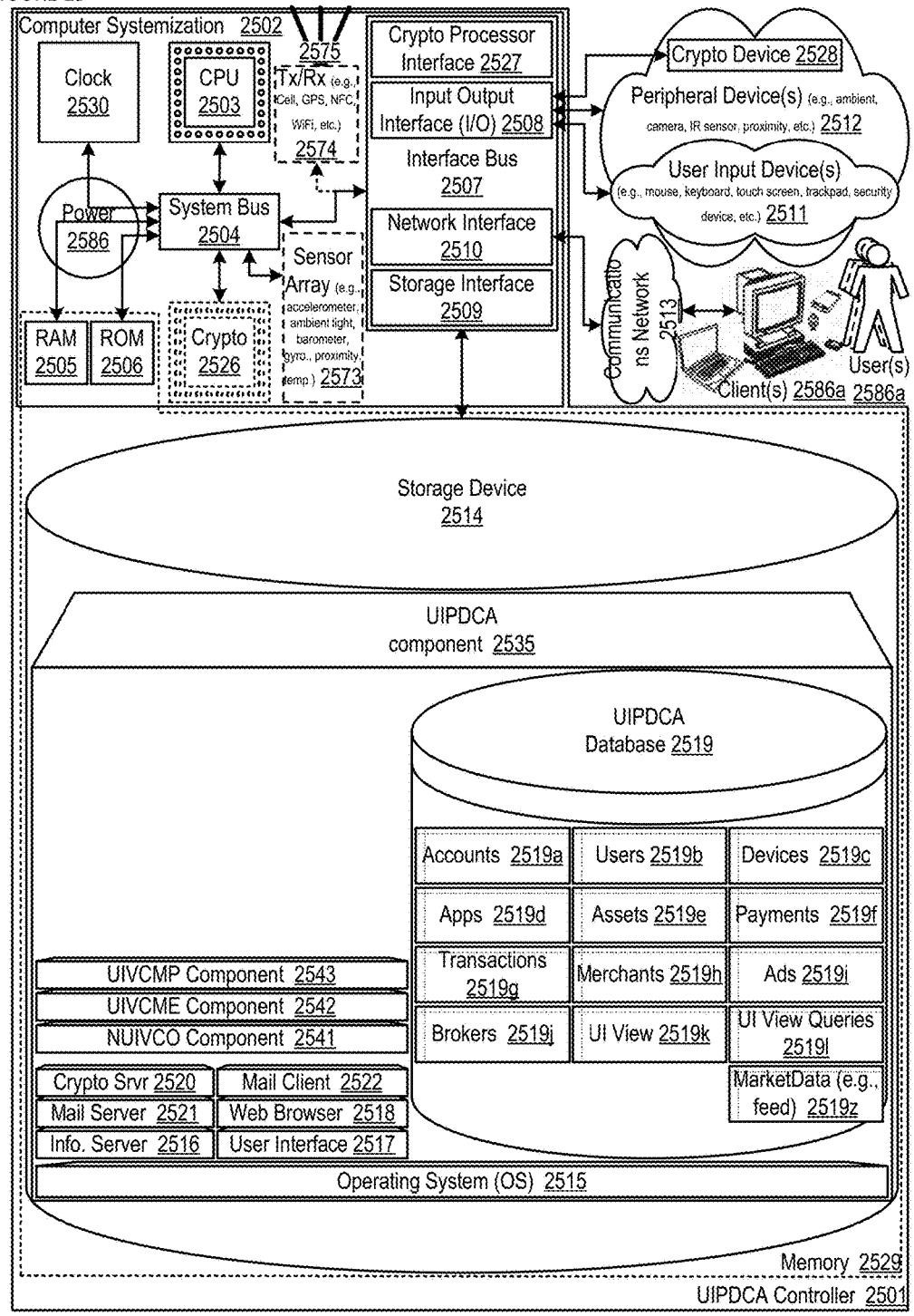
FIG. 25 shows a block diagram illustrating embodiments of a UIPDCA controller.

FIG. 25 shows a block diagram illustrating embodiments of a UIPDCA controller. In this embodiment, the UIPDCA controller 2501 may serve to aggregate, process, store, search, serve, identify, instruct, generate, match, and/or facilitate interactions with a computer through user interface views and databases technologies, and/or other related data.

Typically, users, which may be people and/or other systems, may engage information technology systems (e.g., computers) to facilitate information processing. In turn, computers employ processors to process information; such processors 2503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit is components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the UIPDCA controller 2501 may be connected to and/or communicate with entities such as, but not limited to: one or more users from peripheral devices 2512 (e.g., user input devices 2511); an optional cryptographic processor device 2528; and/or a communications network 2513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The UIPDCA controller 2501 may be based on computer systems that may comprise, but are not limited to, components such as: a computer systemization 2502 connected to memory 2529.

Computer Systemization

A computer systemization 2502 may comprise a clock 2530, central processing unit ("CPU(s)" and/or "processor(s)" (these terms are used interchangeable throughout the disclosure unless noted to the contrary)) 2503, a memory 2529 (e.g., a read only memory (ROM) 2506, a random access memory (RAM) 2505, etc.), and/or an interface bus 2507, and most frequently, although not necessarily, are all interconnected and/or communicating through a system bus 2504 on one or more (mother)board(s) 2502 having conductive and/or otherwise transportive circuit pathways through which instructions (e.g., binary encoded signals) may travel to effectuate communications, operations, storage, etc. The computer systemization may be connected to a power source 2586; e.g., optionally the power source may be internal. Optionally, a cryptographic processor 2526 may be connected to the system bus. In another embodiment, the cryptographic processor, transceivers (e.g., ICs) 2574, and/or sensor array (e.g., accelerometer, altimeter, ambient light, barometer, global positioning system (GPS) (thereby allowing UIPDCA controller to determine its location), gyroscope, magnetometer, pedometer, proximity, ultra-violet sensor, etc.) 2573 may be connected as either internal and/or external peripheral devices 2512 via the interface bus I/O 2508 (not pictured) and/or directly via the interface bus 2507. In turn, the transceivers may be connected to antenna(s) 2575, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the UIPDCA controller and beyond through various interfaces. Should processing requirements dictate a greater amount speed and/or capacity, distributed processors (e.g., see Distributed UIPDCA below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the UIPDCA may be achieved by implementing a microcontroller such as CAST's R8051XC2 microcontroller; Intel's MCS 51 (i.e., 8051 microcontroller); and/or the like. Also, to implement certain features of the UIPDCA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the UIPDCA component collection (distributed or otherwise) and/or features may be implemented via the microprocessor and/or via embedded components; e.g., via ASIC, coprocessor, DSP, FPGA, and/or the like. Alternately, some implementations of the UIPDCA may be implemented with embedded components that are configured and used to achieve a variety of features or signal processing.

Depending on the particular implementation, the embedded components may include software solutions, hardware solutions, and/or some combination of both hardware/software solutions. For example, UIPDCA features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the UIPDCA features. A hierarchy of programmable interconnects allow logic blocks to be interconnected as needed by the UIPDCA system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the UIPDCA may be developed on regular FPGAs and then migrated into a fixed version that more resembles ASIC implementations. Alternate or coordinating implementations may migrate UIPDCA controller features to a final ASIC instead of or in addition to FPGAs. Depending on the implementation all of the aforementioned embedded components and microprocessors may be considered the "CPU" and/or "processor" for the UIPDCA.

Power Source

The power source 2586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2586 is connected to at least one of the interconnected subsequent components of the UIPDCA thereby providing an electric current to all subsequent components. In one example, the power source 2586 is connected to the system bus component 2504. In an alternative embodiment, an outside power source 2586 is provided through a connection across the I/O 2508 interface. For example, a USB and/or IEEE 1394 connection carries both data and power across the connection and is therefore a suitable source of power.

Interface Adapters

Interface bus(ses) 2507 may accept, connect, and/or communicate to a number of interface adapters, conventionally although not necessarily in the form of adapter cards, such as but not limited to: input output interfaces (I/O) 2508, storage interfaces 2509, network interfaces 2510, and/or the like. Optionally, cryptographic processor interfaces 2527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 2509 may accept, communicate, and/or connect to a number of storage devices such as, but not limited to: storage devices 2514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2510 may accept, communicate, and/or connect to a communications network 2513. Through a communications network 2513, the UIPDCA controller is accessible through remote clients 2533b (e.g., computers with web browsers) by users 2533a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed UIPDCA below), architectures may similarly be employed to pool, load balance, and/or otherwise decrease/increase the communicative bandwidth required by the UIPDCA controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2510 may be used to engage with various communications network types 2513. For example, multiple network interfaces may be employed to allow for the communication over broadcast, multicast, and/or unicast networks.

Input Output interfaces (I/O) 2508 may accept, communicate, and/or connect to user, peripheral devices 2512 (e.g., input devices 2511), cryptographic processor devices 2528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2512 may be connected and/or communicate to I/O and/or other facilities of the like such as network interfaces, storage interfaces, directly to the interface bus, system bus, the CPU, and/or the like. Peripheral devices may be external, internal and/or part of the UIPDCA controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2511 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the UIPDCA controller may be embodied as an embedded, dedicated, and/or monitor-less (i.e., headless) device, wherein access would be provided over a network interface connection.

Cryptographic units such as, but not limited to, microcontrollers, processors 2526, interfaces 2527, and/or devices 2528 may be attached, and/or communicate with the UIPDCA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2529. However, memory is a fungible technology and resource, thus, any number of memory embodiments may be employed in lieu of or in concert with one another. It is to be understood that the UIPDCA controller and/or a computer systemization may employ various forms of memory 2529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2529 will include ROM 2506, RAM 2505, and a storage device 2514. A storage device 2514 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2529 may contain a collection of program and/or database components and/or data such as, but not limited to: operating system component(s) 2515 (operating system); information server component(s) 2516 (information server); user interface component(s) 2517 (user interface); Web browser component(s) 2518 (Web browser); database(s) 2519; mail server component(s) 2521; mail client component(s) 2522; cryptographic server component(s) 2520 (cryptographic server); the UIPDCA component(s) 2535; and/or the like (i.e., collectively a component collection). These components may be stored and accessed from the storage devices and/or from storage devices accessible through an interface bus. Although non-conventional program components such as those in the component collection, typically, are stored in a local storage device 2514, they may also be loaded and/or stored in memory such as: peripheral devices, RAM, remote storage facilities through a communications network, ROM, various forms of memory, and/or the like.

Operating System

The operating system component 2515 is an executable program component facilitating the operation of the UIPDCA controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the UIPDCA controller to communicate with other entities through a communications network 2513. Various communication protocols may be used by the UIPDCA controller as a subcarrier transport mechanism for interaction, such as, but not limited to: multicast, TCP/IP, UDP, unicast, and/or the like.

Information Server

An information server component 2516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the UIPDCA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the UIPDCA database 2519, operating systems, other program components, user interfaces, Web browsers, and/or the like.

Access to the UIPDCA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the UIPDCA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the UIPDCA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2518 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the UIPDCA enabled nodes. The combined application may be nugatory on systems employing standard Web browsers.

Mail Server

A mail server component 2521 is a stored program component that is executed by a CPU 2503. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the UIPDCA. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the UIPDCA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2522 is a stored program component that is executed by a CPU 2503. The mail client may be a conventional mail viewing application such as Apple Mail, Microsoft Entourage, Microsoft Outlook, Microsoft Outlook Express, Mozilla, Thunderbird, and/or the like.

Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2520 is a stored program component that is executed by a CPU 2503, cryptographic processor 2526, cryptographic processor interface 2527, cryptographic processor device 2528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the UIPDCA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the UIPDCA component to engage in secure transactions if so desired. The cryptographic component facilitates the secure accessing of resources on the UIPDCA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The UIPDCA Database

The UIPDCA database component 2519 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the UIPDCA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UIPDCA database is implemented as a data-structure, the use of the UIPDCA database 2519 may be integrated into another component such as the UIPDCA component 2535. Also, the database may be implemented as a mix of data structures, objects, and relational structures. Databases may be consolidated and/or distributed in countless variations (e.g., see Distributed UIPDCA below). Portions of databases, e.g., tables, may be exported and/or imported and thus decentralized and/or integrated.

In one embodiment, the database component 2519 includes several tables 2519a-z:

An accounts table 2519a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2519b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a UIPDCA);

An devices table 2519c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2519d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2519e includes fields such as, but not limited to: assetID, accountID, userID, distributorAccountID, distributorPaymentID, distributorOwnerID, as setOwnerID, as setType, as setSourceDeviceID, as setSourceDeviceType, as setSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 2519f includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2519g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2519h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 2519i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherindustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionIDS, impressionTimeStamp, impressionGeo, impressionAction, impressionType, impressionPublisherID, impressionPublisherURL, and/or the like;

A broker table 2519j includes fields such as, but not limited to: merchantID, brokerTaxID, brokerName, brokerContactUserID, accountID, issuerID, acquirerID, brokerEmail, brokerAddress, brokerState, brokerZIPcode, brokerCountry, brokerAuthKey, brokerIPaddress, portNum, brokerURLaccessCode, brokerPortNo, brokerAccessPrivileges, brokerPreferences, brokerRestrictions, and/or the like;

An UI_View table 2519k includes fields such as, but not limited to: UIID, superviewID, subviewID, ULtemplate, UIViewQueryID, fieldID, queryModifier, market_data_feed_ID, userID, accountID, channelID, and/or the like;

An UI_View_Queries table 2519l includes fields such as, but not limited to: UIQueryID, UIID, superviewID, subviewID, ULtemplate, UIViewQueryID, fieldID, queryModifier, queryString, queryValue, market_data_feed_ID, userID, accountID, channelID, and/or the like;

A market_data table 2519z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.

In one embodiment, the UIPDCA database may interact with other database systems. For example, employing a distributed database system, queries and data access by search UIPDCA component may treat the combination of the UIPDCA database, an integrated data security layer database as a single database entity (e.g., see Distributed UIPDCA below).

In one embodiment, user programs may contain various user interface primitives, which may serve to update the UIPDCA. Also, various accounts may require custom database tables depending upon the environments and the types of clients the UIPDCA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2519*a*-*z*. The UIPDCA may be configured to keep track of various settings, inputs, and parameters via database controllers.

The UIPDCA database may communicate to and/or with other components in a component collection, including itself, and/or facilities of the like. Most frequently, the UIPDCA database communicates with the UIPDCA component, other program components, and/or the like. The database may contain, retain, and provide information regarding other nodes and data.

The UIPDCAs

The UIPDCA component 2535 is a stored program component that is executed by a CPU. In one embodiment, the UIPDCA component incorporates any and/or all combinations of the aspects of the UIPDCA that was discussed in the previous figures. As such, the UIPDCA affects accessing, obtaining and the provision of information, services, transactions, and/or the like across various communications networks. The features and embodiments of the UIPDCA discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the UIPDCA's features and facilities, and in many cases reduce the costs, energy consumption/requirements, and extend the life of UIPDCA's underlying infrastructure; this has the added benefit of making the UIPDCA more reliable. Similarly, many of the features and mechanisms are designed to be easier for users to use and access, thereby broadening the audience that may enjoy/employ and exploit the feature sets of the UIPDCA; such ease of use also helps to increase the reliability of the UIPDCA. In addition, the feature sets include heightened security as noted via the Cryptographic components 2520, 2526, 2528 and throughout, making access to the features and data more reliable and secure.

The UIPDCA transforms database data sets, user interface widget data selections inputs, via UIPDCA components (e.g., NUIVCO, UIVCME, UIVCMP), into cascading UI subsequent views data selections and channel outputs.

The UIPDCA component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the UIPDCA server employs a cryptographic server to encrypt and decrypt communications. The UIPDCA component may communicate to and/or with other components in a component collection, including itself, and/or facilities of the like. Most frequently, the UIPDCA component communicates with the UIPDCA database, operating systems, other program components, and/or the like. The UIPDCA may contain, communicate, generate, obtain, and/or provide program component, system, user, and/or data communications, requests, and/or responses.

Distributed UIPDCAs

The structure and/or operation of any of the UIPDCA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the UIPDCA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for UIPDCA controller and/or UIPDCA component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the UIPDCA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication $sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
    $input=" ";
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database ?>
```

Also, the following resources may be used to provide example embodiments regarding SOAP parser implementation:

http://www.xay.com/perl/site/lib/SOAP/Parser.html http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A data cascade user interface view apparatus, comprising:
a memory;
a component collection in the memory, including:
   a user interface (UI) view component, and
   a subsequent UI view component;
a processor disposed in communication with the memory, and configured to issue a plurality of processing instructions from the component collection stored in the memory,
   wherein the processor issues instructions from the UI view component, stored in the memory, to:
      obtain, via at least one processor, a user selection of a UI widget element from the UI view component;
      determine, via at least one processor, a first data source parameter associated with the user selection;
      determine, via at least one processor, a channel associated with the UI view component;
      generate, via at least one processor, a first event message that specifies the first data source parameter and the channel associated with the UI view component; and
      broadcast, via at least one processor, the first event message;
   wherein the processor issues instructions from the subsequent UI view component, stored in the memory, to:
      obtain, via at least one processor, the first event message;
      determine, via at least one processor, a channel associated with the subsequent UI view component;
      determine, via at least one processor, that the subsequent UI view component should process the first event message based at least on determining that the channel specified in the first event message and the channel associated with the subsequent UI view component match;
      retrieve, via at least one processor, a query associated with the subsequent UI view component;
      modify, via at least one processor, the query using the data source parameter specified in the first event message;
      provide, via at least one processor, the modified query to a database;
      obtain, via at least one processor, result data associated with executing the provided query;
      update, via at least one processor, UI widget elements of the subsequent UI view component using the obtained result data;
      determine, via at least one processor, a default selection of a UI widget element from the subsequent UI view component associated with the update;
      determine, via at least one processor, a second data source parameter associated with the default selection;
      generate, via at least one processor, a second event message that specifies the second data source parameter and the channel associated with the subsequent UI view component; and
      broadcast, via at least one processor, the second event message.

2. The apparatus of embodiment 1, wherein the user selection is a selection of a row in a grid.

3. The apparatus of embodiment 1, wherein the first data source parameter is one or more of: identifier of a database table, identifier of a dataset, a row selection filter.

4. The apparatus of embodiment 1, wherein the UI view component is the master of the subsequent UI view component.

5. The apparatus of embodiment 4, wherein the determination that the subsequent UI view component should process the first event message is also based on the first event message originating from the master of the subsequent UI view component.

6. The apparatus of embodiment 4,
   wherein the first event message further specifies a query modifier parameter associated with a filter of the UI view component; and
   wherein the processor issues instructions from the subsequent UI view component, stored in the memory, to:
      modify, via at least one processor, the query using the query modifier parameter specified in the first event message.

7. The apparatus of embodiment 1, wherein the subsequent UI view component is a masterless receiver.

8. The apparatus of embodiment 7, further comprising:
   the processor issues instructions from the subsequent UI view component, stored in the memory, to:
      determine, via at least one processor, one or more event data fields that should be specified in an event message in order for the subsequent UI view component to handle the event message; and
   wherein the determination that the subsequent UI view component should process the first event message is also based on the first event message specifying the determined one or more event data fields.

9. The apparatus of embodiment 7, further comprising:
   the processor issues instructions from the subsequent UI view component, stored in the memory, to:
      determine, via at least one processor, the UI view component type of the subsequent UI view component;
   wherein the first event message further specifies a UI view component type of UI view components that can handle the first event message; and
   wherein the determination that the subsequent UI view component should process the first event message is also based on determining that the UI view component type specified in the first event message and the UI view component type of the subsequent UI view component match.

10. The apparatus of embodiment 7, further comprising:
    the processor issues instructions from the subsequent UI view component, stored in the memory, to:
       determine, via at least one processor, a transformation function associated with the subsequent UI view component; and
       modify, via at least one processor, the query using the transformation function.

11. The apparatus of embodiment 10, wherein the transformation function modifies the query by transforming the query into a plurality of different queries.

12. The apparatus of embodiment 1, further comprising:
    the processor issues instructions from the subsequent UI view component, stored in the memory, to:
       determine, via at least one processor, a query modifier parameter associated with a filter of the subsequent UI view component; and
       modify, via at least one processor, the query using the query modifier parameter.

13. The apparatus of embodiment 1, wherein the UI view component is associated with a UI view component data structure that specifies (a) a visualization associated with the UI view component, (b) a channel associated with the UI view component, (c) a query associated with the UI view component, (d) a data source parameter associated with the UI view component, (e) a query modifier parameter associated with the UI view component, (f) a transformation function associated with the UI view component, and (g) a local filter associated with the UI view component.

14. The apparatus of embodiment 1, wherein the UI view component is a root emitter incapable of acting as a receiver.

15. The apparatus of embodiment 1, wherein the subsequent UI view component is one of a plurality of UI view components that update their respective UI widget elements based on the first event message.

16. A processor-readable data cascade user interface view non-transient physical medium storing processor-executable components, the components, comprising:
a component collection stored in the medium, including:
    a user interface (UI) view component, and
    a subsequent UI view component;
    wherein the UI view component, stored in the medium, includes processor-issuable instructions to:
        obtain, via at least one processor, a user selection of a UI widget element from the UI view component;
        determine, via at least one processor, a first data source parameter associated with the user selection;
        determine, via at least one processor, a channel associated with the UI view component;
        generate, via at least one processor, a first event message that specifies the first data source parameter and the channel associated with the UI view component; and
        broadcast, via at least one processor, the first event message;
    wherein the subsequent UI view component, stored in the medium, includes processor-issuable instructions to:
        obtain, via at least one processor, the first event message;
        determine, via at least one processor, a channel associated with the subsequent UI view component;
        determine, via at least one processor, that the subsequent UI view component should process the first event message based at least on determining that the channel specified in the first event message and the channel associated with the subsequent UI view component match;
        retrieve, via at least one processor, a query associated with the subsequent UI view component;
        modify, via at least one processor, the query using the data source parameter specified in the first event message;
        provide, via at least one processor, the modified query to a database;
        obtain, via at least one processor, result data associated with executing the provided query;
        update, via at least one processor, UI widget elements of the subsequent UI view component using the obtained result data;
        determine, via at least one processor, a default selection of a UI widget element from the subsequent UI view component associated with the update;
        determine, via at least one processor, a second data source parameter associated with the default selection;
        generate, via at least one processor, a second event message that specifies the second data source parameter and the channel associated with the subsequent UI view component; and
        broadcast, via at least one processor, the second event message.

17. The medium of embodiment 16, wherein the user selection is a selection of a row in a grid.

18. The medium of embodiment 16, wherein the first data source parameter is one or more of: identifier of a database table, identifier of a dataset, a row selection filter.

19. The medium of embodiment 16, wherein the UI view component is the master of the subsequent UI view component.

20. The medium of embodiment 19, wherein the determination that the subsequent UI view component should process the first event message is also based on the first event message originating from the master of the subsequent UI view component.

21. The medium of embodiment 19,
    wherein the first event message further specifies a query modifier parameter associated with a filter of the UI view component; and
    wherein the subsequent UI view component, stored in the medium, includes processor-issuable instructions to:
        modify, via at least one processor, the query using the query modifier parameter specified in the first event message.

22. The medium of embodiment 16, wherein the subsequent UI view component is a masterless receiver.

23. The medium of embodiment 22, further comprising:
    the subsequent UI view component, stored in the medium, includes processor-issuable instructions to:
        determine, via at least one processor, one or more event data fields that should be specified in an event message in order for the subsequent UI view component to handle the event message; and
    wherein the determination that the subsequent UI view component should process the first event message is also based on the first event message specifying the determined one or more event data fields.

24. The medium of embodiment 22, further comprising:
    the subsequent UI view component, stored in the medium, includes processor-issuable instructions to:
        determine, via at least one processor, the UI view component type of the subsequent UI view component;
    wherein the first event message further specifies a UI view component type of UI view components that can handle the first event message; and
    wherein the determination that the subsequent UI view component should process the first event message is also based on determining that the UI view component type specified in the first event message and the UI view component type of the subsequent UI view component match.

25. The medium of embodiment 22, further comprising:
    the subsequent UI view component, stored in the medium, includes processor-issuable instructions to:
        determine, via at least one processor, a transformation function associated with the subsequent UI view component; and
        modify, via at least one processor, the query using the transformation function.

26. The medium of embodiment 25, wherein the transformation function modifies the query by transforming the query into a plurality of different queries.

27. The medium of embodiment 16, further comprising:
the subsequent UI view component, stored in the medium, includes processor-issuable instructions to:
determine, via at least one processor, a query modifier parameter associated with a filter of the subsequent UI view component; and
modify, via at least one processor, the query using the query modifier parameter.

28. The medium of embodiment 16, wherein the UI view component is associated with a UI view component data structure that specifies (a) a visualization associated with the UI view component, (b) a channel associated with the UI view component, (c) a query associated with the UI view component, (d) a data source parameter associated with the UI view component, (e) a query modifier parameter associated with the UI view component, (f) a transformation function associated with the UI view component, and (g) a local filter associated with the UI view component.

29. The medium of embodiment 16, wherein the UI view component is a root emitter incapable of acting as a receiver.

30. The medium of embodiment 16, wherein the subsequent UI view component is one of a plurality of UI view components that update their respective UI widget elements based on the first event message.

31. A processor-implemented data cascade user interface view system, comprising:
a user interface (UI) view component means, to:
obtain, via at least one processor, a user selection of a UI widget element from the UI view component;
determine, via at least one processor, a first data source parameter associated with the user selection;
determine, via at least one processor, a channel associated with the UI view component;
generate, via at least one processor, a first event message that specifies the first data source parameter and the channel associated with the UI view component; and
broadcast, via at least one processor, the first event message;
a subsequent UI view component means, to:
obtain, via at least one processor, the first event message;
determine, via at least one processor, a channel associated with the subsequent UI view component;
determine, via at least one processor, that the subsequent UI view component should process the first event message based at least on determining that the channel specified in the first event message and the channel associated with the subsequent UI view component match;
retrieve, via at least one processor, a query associated with the subsequent UI view component;
modify, via at least one processor, the query using the data source parameter specified in the first event message;
provide, via at least one processor, the modified query to a database;
obtain, via at least one processor, result data associated with executing the provided query;
update, via at least one processor, UI widget elements of the subsequent UI view component using the obtained result data;
determine, via at least one processor, a default selection of a UI widget element from the subsequent UI view component associated with the update;
determine, via at least one processor, a second data source parameter associated with the default selection;
generate, via at least one processor, a second event message that specifies the second data source parameter and the channel associated with the subsequent UI view component; and
broadcast, via at least one processor, the second event message.

32. The system of embodiment 31, wherein the user selection is a selection of a row in a grid.

33. The system of embodiment 31, wherein the first data source parameter is one or more of: identifier of a database table, identifier of a dataset, a row selection filter.

34. The system of embodiment 31, wherein the UI view component is the master of the subsequent UI view component.

35. The system of embodiment 34, wherein the determination that the subsequent UI view component should process the first event message is also based on the first event message originating from the master of the subsequent UI view component.

36. The system of embodiment 34,
wherein the first event message further specifies a query modifier parameter associated with a filter of the UI view component; and
the subsequent UI view component means, to:
modify, via at least one processor, the query using the query modifier parameter specified in the first event message.

37. The system of embodiment 31, wherein the subsequent UI view component is a masterless receiver.

38. The system of embodiment 37, further comprising:
the subsequent UI view component means, to:
determine, via at least one processor, one or more event data fields that should be specified in an event message in order for the subsequent UI view component to handle the event message; and
wherein the determination that the subsequent UI view component should process the first event message is also based on the first event message specifying the determined one or more event data fields.

39. The system of embodiment 37, further comprising:
the subsequent UI view component means, to:
determine, via at least one processor, the UI view component type of the subsequent UI view component;
wherein the first event message further specifies a UI view component type of UI view components that can handle the first event message; and
wherein the determination that the subsequent UI view component should process the first event message is also based on determining that the UI view component type specified in the first event message and the UI view component type of the subsequent UI view component match.

40. The system of embodiment 37, further comprising:
the subsequent UI view component means, to:
determine, via at least one processor, a transformation function associated with the subsequent UI view component; and
modify, via at least one processor, the query using the transformation function.

41. The system of embodiment 40, wherein the transformation function modifies the query by transforming the query into a plurality of different queries.

42. The system of embodiment 31, further comprising:
the subsequent UI view component means, to:
determine, via at least one processor, a query modifier parameter associated with a filter of the subsequent UI view component; and
modify, via at least one processor, the query using the query modifier parameter.
43. The system of embodiment 31, wherein the UI view component is associated with a UI view component data structure that specifies (a) a visualization associated with the UI view component, (b) a channel associated with the UI view component, (c) a query associated with the UI view component, (d) a data source parameter associated with the UI view component, (e) a query modifier parameter associated with the UI view component, (f) a transformation function associated with the UI view component, and (g) a local filter associated with the UI view component.
44. The system of embodiment 31, wherein the UI view component is a root emitter incapable of acting as a receiver.
45. The system of embodiment 31, wherein the subsequent UI view component is one of a plurality of UI view components that update their respective UI widget elements based on the first event message.
46. A processor-implemented data cascade user interface view method, comprising:
executing processor-implemented user interface (UI) view component instructions to:
obtain, via at least one processor, a user selection of a UI widget element from the UI view component;
determine, via at least one processor, a first data source parameter associated with the user selection;
determine, via at least one processor, a channel associated with the UI view component;
generate, via at least one processor, a first event message that specifies the first data source parameter and the channel associated with the UI view component; and
broadcast, via at least one processor, the first event message;
executing processor-implemented subsequent UI view component instructions to:
obtain, via at least one processor, the first event message;
determine, via at least one processor, a channel associated with the subsequent UI view component;
determine, via at least one processor, that the subsequent UI view component should process the first event message based at least on determining that the channel specified in the first event message and the channel associated with the subsequent UI view component match;
retrieve, via at least one processor, a query associated with the subsequent UI view component;
modify, via at least one processor, the query using the data source parameter specified in the first event message;
provide, via at least one processor, the modified query to a database;
obtain, via at least one processor, result data associated with executing the provided query;
update, via at least one processor, UI widget elements of the subsequent UI view component using the obtained result data;

determine, via at least one processor, a default selection of a UI widget element from the subsequent UI view component associated with the update;
determine, via at least one processor, a second data source parameter associated with the default selection;
generate, via at least one processor, a second event message that specifies the second data source parameter and the channel associated with the subsequent UI view component; and
broadcast, via at least one processor, the second event message.
47. The method of embodiment 46, wherein the user selection is a selection of a row in a grid.
48. The method of embodiment 46, wherein the first data source parameter is one or more of: identifier of a database table, identifier of a dataset, a row selection filter.
49. The method of embodiment 46, wherein the UI view component is the master of the subsequent UI view component.
50. The method of embodiment 49, wherein the determination that the subsequent UI view component should process the first event message is also based on the first event message originating from the master of the subsequent UI view component.
51. The method of embodiment 49,
wherein the first event message further specifies a query modifier parameter associated with a filter of the UI view component; and
executing processor-implemented subsequent UI view component instructions to:
modify, via at least one processor, the query using the query modifier parameter specified in the first event message.
52. The method of embodiment 46, wherein the subsequent UI view component is a masterless receiver.
53. The method of embodiment 52, further comprising:
executing processor-implemented subsequent UI view component instructions to:
determine, via at least one processor, one or more event data fields that should be specified in an event message in order for the subsequent UI view component to handle the event message; and
wherein the determination that the subsequent UI view component should process the first event message is also based on the first event message specifying the determined one or more event data fields.
54. The method of embodiment 52, further comprising:
executing processor-implemented subsequent UI view component instructions to:
determine, via at least one processor, the UI view component type of the subsequent UI view component;
wherein the first event message further specifies a UI view component type of UI view components that can handle the first event message; and
wherein the determination that the subsequent UI view component should process the first event message is also based on determining that the UI view component type specified in the first event message and the UI view component type of the subsequent UI view component match.
55. The method of embodiment 52, further comprising:
executing processor-implemented subsequent UI view component instructions to:

determine, via at least one processor, a transformation function associated with the subsequent UI view component; and modify, via at least one processor, the query using the transformation function.

56. The method of embodiment 55, wherein the transformation function modifies the query by transforming the query into a plurality of different queries.

57. The method of embodiment 46, further comprising:
executing processor-implemented subsequent UI view component instructions to:
determine, via at least one processor, a query modifier parameter associated with a filter of the subsequent UI view component; and
modify, via at least one processor, the query using the query modifier parameter.

58. The method of embodiment 46, wherein the UI view component is associated with a UI view component data structure that specifies (a) a visualization associated with the UI view component, (b) a channel associated with the UI view component, (c) a query associated with the UI view component, (d) a data source parameter associated with the UI view component, (e) a query modifier parameter associated with the UI view component, (f) a transformation function associated with the UI view component, and (g) a local filter associated with the UI view component.

59. The method of embodiment 46, wherein the UI view component is a root emitter incapable of acting as a receiver.

60. The method of embodiment 46, wherein the subsequent UI view component is one of a plurality of UI view components that update their respective UI widget elements based on the first event message.

In order to address various issues and advance the art, the entirety of this application for User Interface Portlet Data Cascade Actuator Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not nor should they be interpreted as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a UIPDCA individual and/or enterprise user, database configuration and/or relational model, data type, data transmission and/or network framework, syntax structure, and/or the like, various embodiments of the UIPDCA, may be implemented that enable a great deal of flexibility and customization. For example, aspects of the UIPDCA may be adapted for general computer user interfaces for data search, commerce, large data traversal, customer relationship management systems interfaces, information tracking, and monitoring, etc. While various embodiments and discussions of the UIPDCA have included user interface views and databases, however, it is to be understood that the embodiments described herein may be readily configured and/or customized for a wide variety of other applications and/or implementations.

What is claimed is:

1. A data cascade user interface view apparatus, comprising:
a memory;
a component collection in the memory, including:
a user interface (UI) view component, and
a subsequent UI view component;
a processor disposed in communication with the memory, and configured to issue a plurality of processing instructions from the component collection stored in the memory,
wherein the processor issues instructions from the UI view component, stored in the memory, to:
obtain, via at least one processor, a user selection of a UI widget element from the UI view component;
determine, via at least one processor, a first data source parameter associated with the user selection;
determine, via at least one processor, a channel associated with the UI view component;
generate, via at least one processor, a first event message that specifies the first data source parameter and the channel associated with the UI view component; and
broadcast, via at least one processor, the first event message;
wherein the processor issues instructions from the subsequent UI view component, stored in the memory, to:
obtain, via at least one processor, the first event message;
determine, via at least one processor, a channel associated with the subsequent UI view component;
determine, via at least one processor, that the subsequent UI view component should process the first event message based at least on determining that the channel specified in the first event message and the channel associated with the subsequent UI view component match;
retrieve, via at least one processor, a query associated with the subsequent UI view component;
modify, via at least one processor, the query using the data source parameter specified in the first event message;
provide, via at least one processor, the modified query to a database;
obtain, via at least one processor, result data associated with executing the provided query;
update, via at least one processor, UI widget elements of the subsequent UI view component using the obtained result data;
determine, via at least one processor, a default selection of a UI widget element from the subsequent UI view component associated with the update;
determine, via at least one processor, a second data source parameter associated with the default selection;
generate, via at least one processor, a second event message that specifies the second data source parameter and the channel associated with the subsequent UI view component; and
broadcast, via at least one processor, the second event message.

2. The apparatus of claim 1, wherein the user selection is a selection of a row in a grid.

3. The apparatus of claim 1, wherein the first data source parameter is one or more of: identifier of a database table, identifier of a dataset, a row selection filter.

4. The apparatus of claim 1, wherein the UI view component is the master of the subsequent UI view component.

5. The apparatus of claim 4, wherein the determination that the subsequent UI view component should process the first event message is also based on the first event message originating from the master of the subsequent UI view component.

6. The apparatus of claim 4,
wherein the first event message further specifies a query modifier parameter associated with a filter of the UI view component; and
wherein the processor issues instructions from the subsequent UI view component, stored in the memory, to:
modify, via at least one processor, the query using the query modifier parameter specified in the first event message.

7. The apparatus of claim 1, wherein the subsequent UI view component is a masterless receiver.

8. The apparatus of claim 7, further comprising:
the processor issues instructions from the subsequent UI view component, stored in the memory, to:
determine, via at least one processor, one or more event data fields that should be specified in an event message in order for the subsequent UI view component to handle the event message; and
wherein the determination that the subsequent UI view component should process the first event message is also based on the first event message specifying the determined one or more event data fields.

9. The apparatus of claim 7, further comprising:
the processor issues instructions from the subsequent UI view component, stored in the memory, to:
determine, via at least one processor, the UI view component type of the subsequent UI view component;
wherein the first event message further specifies a UI view component type of UI view components that can handle the first event message; and
wherein the determination that the subsequent UI view component should process the first event message is also based on determining that the UI view component type specified in the first event message and the UI view component type of the subsequent UI view component match.

10. The apparatus of claim 7, further comprising:
the processor issues instructions from the subsequent UI view component, stored in the memory, to:
determine, via at least one processor, a transformation function associated with the subsequent UI view component; and
modify, via at least one processor, the query using the transformation function.

11. The apparatus of claim 10, wherein the transformation function modifies the query by transforming the query into a plurality of different queries.

12. The apparatus of claim 1, further comprising:
the processor issues instructions from the subsequent UI view component, stored in the memory, to:
determine, via at least one processor, a query modifier parameter associated with a filter of the subsequent UI view component; and
modify, via at least one processor, the query using the query modifier parameter.

13. The apparatus of claim 1, wherein the UI view component is associated with a UI view component data structure that specifies (a) a visualization associated with the UI view component, (b) a channel associated with the UI view component, (c) a query associated with the UI view component, (d) a data source parameter associated with the UI view component, (e) a query modifier parameter associated with the UI view component, (f) a transformation function associated with the UI view component, and (g) a local filter associated with the UI view component.

14. The apparatus of claim 1, wherein the UI view component is a root emitter incapable of acting as a receiver.

15. The apparatus of claim 1, wherein the subsequent UI view component is one of a plurality of UI view components that update their respective UI widget elements based on the first event message.

16. A processor-readable data cascade user interface view non-transient physical medium storing processor-executable components, the components, comprising:
   a component collection stored in the medium, including:
      a user interface (UI) view component, and
      a subsequent UI view component;
      wherein the UI view component, stored in the medium, includes processor-issuable instructions to:
         obtain, via at least one processor, a user selection of a UI widget element from the UI view component;
         determine, via at least one processor, a first data source parameter associated with the user selection;
         determine, via at least one processor, a channel associated with the UI view component;
         generate, via at least one processor, a first event message that specifies the first data source parameter and the channel associated with the UI view component; and
         broadcast, via at least one processor, the first event message;
      wherein the subsequent UI view component, stored in the medium, includes processor-issuable instructions to:
         obtain, via at least one processor, the first event message;
         determine, via at least one processor, a channel associated with the subsequent UI view component;
         determine, via at least one processor, that the subsequent UI view component should process the first event message based at least on determining that the channel specified in the first event message and the channel associated with the subsequent UI view component match;
         retrieve, via at least one processor, a query associated with the subsequent UI view component;
         modify, via at least one processor, the query using the data source parameter specified in the first event message;
         provide, via at least one processor, the modified query to a database;
         obtain, via at least one processor, result data associated with executing the provided query;
         update, via at least one processor, UI widget elements of the subsequent UI view component using the obtained result data;
         determine, via at least one processor, a default selection of a UI widget element from the subsequent UI view component associated with the update;
         determine, via at least one processor, a second data source parameter associated with the default selection;
         generate, via at least one processor, a second event message that specifies the second data source parameter and the channel associated with the subsequent UI view component; and
         broadcast, via at least one processor, the second event message.

17. A processor-implemented data cascade user interface view system, comprising:
   a user interface (UI) view component means, to:
      obtain, via at least one processor, a user selection of a UI widget element from the UI view component;
      determine, via at least one processor, a first data source parameter associated with the user selection;
      determine, via at least one processor, a channel associated with the UI view component;
      generate, via at least one processor, a first event message that specifies the first data source parameter and the channel associated with the UI view component; and
      broadcast, via at least one processor, the first event message;
   a subsequent UI view component means, to:
      obtain, via at least one processor, the first event message;
      determine, via at least one processor, a channel associated with the subsequent UI view component;
      determine, via at least one processor, that the subsequent UI view component should process the first event message based at least on determining that the channel specified in the first event message and the channel associated with the subsequent UI view component match;
      retrieve, via at least one processor, a query associated with the subsequent UI view component;
      modify, via at least one processor, the query using the data source parameter specified in the first event message;
      provide, via at least one processor, the modified query to a database;
      obtain, via at least one processor, result data associated with executing the provided query;
      update, via at least one processor, UI widget elements of the subsequent UI view component using the obtained result data;
      determine, via at least one processor, a default selection of a UI widget element from the subsequent UI view component associated with the update;
      determine, via at least one processor, a second data source parameter associated with the default selection;
      generate, via at least one processor, a second event message that specifies the second data source parameter and the channel associated with the subsequent UI view component; and
      broadcast, via at least one processor, the second event message.

18. A processor-implemented data cascade user interface view method, comprising:
   executing processor-implemented user interface (UI) view component instructions to:
      obtain, via at least one processor, a user selection of a UI widget element from the UI view component;
      determine, via at least one processor, a first data source parameter associated with the user selection;

determine, via at least one processor, a channel associated with the UI view component;

generate, via at least one processor, a first event message that specifies the first data source parameter and the channel associated with the UI view component; and broadcast, via at least one processor, the first event message;

executing processor-implemented subsequent UI view component instructions to:

obtain, via at least one processor, the first event message;

determine, via at least one processor, a channel associated with the subsequent UI view component;

determine, via at least one processor, that the subsequent UI view component should process the first event message based at least on determining that the channel specified in the first event message and the channel associated with the subsequent UI view component match;

retrieve, via at least one processor, a query associated with the subsequent UI view component;

modify, via at least one processor, the query using the data source parameter specified in the first event message;

provide, via at least one processor, the modified query to a database;

obtain, via at least one processor, result data associated with executing the provided query;

update, via at least one processor, UI widget elements of the subsequent UI view component using the obtained result data;

determine, via at least one processor, a default selection of a UI widget element from the subsequent UI view component associated with the update;

determine, via at least one processor, a second data source parameter associated with the default selection;

generate, via at least one processor, a second event message that specifies the second data source parameter and the channel associated with the subsequent UI view component; and broadcast, via at least one processor, the second event message.

* * * * *